(12) United States Patent
Wu et al.

(10) Patent No.: US 11,468,183 B2
(45) Date of Patent: Oct. 11, 2022

(54) DIFFERENTIATED MANAGEMENT AND CONTROL OF TERMINALS WITH MULTIPLE OPERATING SYSTEMS

(71) Applicant: Huawei Technologies Co., Ltd., Shenzhen (CN)

(72) Inventors: Jiangzheng Wu, Hangzhou (CN); Xiaofeng Zheng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 397 days.

(21) Appl. No.: 16/419,580

(22) Filed: May 22, 2019

(65) Prior Publication Data
US 2019/0286829 A1    Sep. 19, 2019

Related U.S. Application Data

(63) Continuation of application No. PCT/CN2017/086375, filed on May 27, 2017.

(30) Foreign Application Priority Data

Nov. 22, 2016 (CN) .......................... 201611039815.6

(51) Int. Cl.
*G06F 9/46* (2006.01)
*G06F 21/62* (2013.01)
(Continued)

(52) U.S. Cl.
CPC ................ *G06F 21/62* (2013.01); *G06F 9/44* (2013.01); *G06F 9/441* (2013.01);
(Continued)

(58) Field of Classification Search
CPC ........... G06F 21/62; G06F 2009/45579; G06F 2009/45595; G06F 9/44; G06F 9/441;
(Continued)

(56) References Cited

U.S. PATENT DOCUMENTS 9,348,626 B2 * 5/2016 Newell ............... G06F 9/45545
9,912,996 B2 * 3/2018 Song .................... H04N 21/637
(Continued)

FOREIGN PATENT DOCUMENTS

CN    101145277 A    3/2008
CN    101493779 A    7/2009
(Continued)

OTHER PUBLICATIONS

Machine Translation and Abstract of Chinese Publication No. CN101493779, Jul. 29, 2009, 16 pages.
(Continued)

*Primary Examiner* — Bradley A Teets
(74) *Attorney, Agent, or Firm* — Conley Rose, P.C.

(57) ABSTRACT

After a terminal receives any piece of control information sent by a management server, if the control information is used to indicate that a foreground operating system of the terminal is a target operating system, the terminal is controlled according to a control instruction carried in the control information. When the foreground operating system of the terminal is not the target operating system, the terminal does not control the terminal according to the control instruction. In addition, the terminal may store a correspondence between a system identifier of the target operating system and the control instruction, so that after the foreground operating system of the terminal is changed to the target operating system, the terminal may further obtain the control instruction based on the correspondence and control the terminal according to the control instruction.

26 Claims, 10 Drawing Sheets

(51) Int. Cl.

| | |
|---|---|
| *G06F 9/4401* | (2018.01) |
| *H04L 41/00* | (2022.01) |
| *H04L 41/0866* | (2022.01) |
| *H04L 67/125* | (2022.01) |
| *H04W 4/50* | (2018.01) |
| *G06F 9/44* | (2018.01) |
| *G06F 9/455* | (2018.01) |
| *G06F 9/54* | (2006.01) |
| *H04L 67/56* | (2022.01) |

(52) U.S. Cl.
 CPC ...... *G06F 9/45541* (2013.01); *G06F 9/45558* (2013.01); *G06F 9/54* (2013.01); *H04L 41/0866* (2013.01); *H04L 41/24* (2013.01); *H04L 67/125* (2013.01); *H04L 67/56* (2022.05); *H04W 4/50* (2018.02); *G06F 2009/45579* (2013.01); *G06F 2009/45595* (2013.01)

(58) Field of Classification Search
 CPC .... G06F 9/45541; G06F 9/45558; G06F 9/54; G06F 41/0866; G06F 41/24; H04W 4/50; H04L 41/0866; H04L 41/24; H04L 67/125; H04L 67/28
 USPC .......................................................... 718/102
 See application file for complete search history.

(56) References Cited

U.S. PATENT DOCUMENTS

| | | | |
|---|---|---|---|
| 10,084,867 B1 * | 9/2018 | Ledet ................. | G06Q 10/1095 |
| 2008/0062002 A1 | 3/2008 | Uehara | |
| 2012/0154413 A1 | 6/2012 | Kim et al. | |
| 2012/0159139 A1 * | 6/2012 | Kim .................... | H04W 12/086 |
| | | | 713/2 |
| 2013/0130653 A1 * | 5/2013 | Deasy ................. | C09J 7/21 |
| | | | 455/411 |
| 2014/0282058 A1 | 9/2014 | Hui | |
| 2014/0351893 A1 | 11/2014 | Corddry et al. | |
| 2015/0264047 A1 * | 9/2015 | Roy ..................... | G06F 21/53 |
| | | | 726/4 |
| 2019/0013963 A1 * | 1/2019 | Papo .................. | H04L 12/4625 |
| 2020/0314739 A1 * | 10/2020 | Li ........................ | H04W 88/06 |

FOREIGN PATENT DOCUMENTS

| | | |
|---|---|---|
| CN | 102148841 A | 8/2011 |
| CN | 102566884 A | 7/2012 |
| CN | 104049858 A | 9/2014 |
| CN | 104093077 A | 10/2014 |
| CN | 105025467 A | 11/2015 |
| CN | 105046156 A | 11/2015 |
| CN | 105138896 A | 12/2015 |
| WO | WO-03073743 A2 * | 9/2003 ............. H04L 67/28 |

OTHER PUBLICATIONS

Machine Translation and Abstract of Chinese Publication No. CN102148841, Aug. 10, 2011, 13 pages.
Machine Translation and Abstract of Chinese Publication No. CN104093077, Oct. 8, 2014, 25 pages.
Dall, C., et al., "The Design, Implementation, and Evaluation of Cells: A Virtual Smartphone Architecture," Published in ACM Transactions on Computer System, XP058007534, vol. 30, No. 3, Aug. 1, 2012,16 pages.
Jaramillo, D., "Virtualization Techniques for Mobile Systems," Florida Atlantic University, Boca Raton, Forida, XP055365518, Dec. 2013, 59 pages.
Wikipedia,"Mobile device management," XP055553423, retrieved form internet on Feb. 7, 2019, Nov. 2, 2016, 3 pages.
Foreign Communication From A Counterpart Application, European Application No. 17873021.4, Extended European Search Report dated Feb. 19, 2019, 13 pages.
Foreign Communication From A Counterpart Application, PCT Application No. PCT/CN2017/086375, English Translation of International Search Report dated Aug. 2, 2017, 2 pages.
Foreign Communication From A Counterpart Application, PCT Application No. PCT/CN2017/086375, English Translation of Written Opinion dated Aug. 2, 2017, 4 pages.

* cited by examiner

DIFFERENTIATED MANAGEMENT AND CONTROL OF TERMINALS WITH MULTIPLE OPERATING SYSTEMS

CROSS-REFERENCE TO RELATED APPLICATIONS

This application is a continuation application of Int'l Patent App. No. PCT/CN2017/086375 filed on May 27, 2017, which claims priority to Chinese Patent App. No. 201611039815.6 filed on Nov. 22, 2016, which are incorporated by reference.

TECHNICAL FIELD

Embodiments of the present disclosure relate to the field of computer technologies, and in particular, to a terminal control method and apparatus.

BACKGROUND

At present, to increase the value of a private terminal of a staff member, and for convenient use, more staff work on their own private terminals. For example, a staff member installs two operating systems on a private terminal: an office operating system and a personal operating system.

During office hours, the staff member needs to change a foreground operating system of his or her private terminal to the office operating system. During a rest, the staff member can change the foreground operating system of his or her private terminal to the personal operating system and process private services irrelevant to work.

With heated competition among enterprises, data security of the enterprises becomes increasingly important. For data security, there are different requirements on different operating systems of a same terminal. For example, when a staff member is in an office, an IT administrator of an enterprise often hopes that the staff member's private terminal is not allowed to connect to a Wi-Fi access point in the office when a foreground operating system of the staff member's private terminal is a personal operating system. For the sake of work, the IT administrator of the enterprise hopes that when the foreground operating system of the staff member's private terminal is an office operating system, the staff member's private terminal is allowed to connect to a specific Wi-Fi access point in the office.

However, currently there is no differentiated management and control method for a private terminal in a plurality of different operating systems. Therefore, implementing differentiated management and control on the private terminal in the plurality of different operating systems is a technical problem urgently to be resolved.

SUMMARY

To overcome problems in related technologies, embodiments of the present disclosure provide a terminal control method and apparatus.

According to a first aspect of the embodiments of the present disclosure, a terminal control method is provided. The method includes: receiving, by a terminal, first control information sent by a server, where the first control information carries a first control instruction and a system identifier of a first operating system, the first control instruction instructs to perform an indicated operation on the terminal, the first operating system is one of at least two operating systems on the terminal, and the first control information instructs to control the terminal according to the first control instruction when a foreground operating system of the terminal is the first operating system; determining, by the terminal based on the system identifier of the first operating system, that the foreground operating system of the terminal is not the first operating system, and storing, by the terminal, a correspondence between the system identifier of the first operating system and the first control instruction; and after the foreground operating system of the terminal is changed to the first operating system, controlling, by the terminal, the terminal according to the first control instruction in the correspondence.

In this embodiment of the present disclosure, any terminal communicatively connected to a management server may simultaneously receive a plurality of pieces of control information separately sent by the management server. A control instruction carried in each piece of control information is used to control the terminal when a foreground operating system of the terminal is a different operating system. In other words, the terminal may simultaneously receive at least two control instructions, and each of the at least two control instructions is a control instruction used to control the terminal when the foreground operating system of the terminal is a different operating system. However, when the terminal receives the at least two control instructions, only one of at least two operating systems of the terminal is the foreground operating system of the terminal, and other operating systems are background operating systems of the terminal.

Therefore, for any piece of control information that is sent by the management server and received by the terminal, a control instruction carried in the control information is a control instruction used to control the terminal when the foreground operating system of the terminal is a target operating system. The target operating system is one of the at least two operating systems on the terminal. When the foreground operating system of the terminal is not the target operating system, the terminal does not control the terminal according to the control instruction. Then, the terminal may store a correspondence between a system identifier of the target operating system and the control instruction, so that after the foreground operating system of the terminal is changed to the target operating system, the terminal may further obtain the control instruction according to the correspondence, and control the terminal according to the control instruction. In this way, management personnel can control the terminal when the foreground operating system of the terminal is the target operating system, and perform accurate differentiated management and control on the terminal in a plurality of different operating systems.

In the first aspect, the following optional design is also available: Optionally, the method further includes: receiving, by the terminal, second control information sent by the server, where the second control information carries a second control instruction and a system identifier of a second operating system, the second control instruction instructs to perform an indicated operation on the terminal, the second operating system is one of the at least two operating systems on the terminal, and the second control information instructs to control the terminal according to the second control instruction when the foreground operating system of the terminal is the second operating system; and determining, by the terminal based on the system identifier of the second operating system, that the foreground operating system of the terminal is the second operating system, and controlling, by the terminal, the terminal according to the second control instruction.

Because there are at least two operating systems on the terminal, when a terminal user uses the terminal, the user may change the foreground operating system of the terminal. For example, the terminal user changes the foreground operating system of the terminal from a personal operating system to an office operating system, or changes the foreground operating system of the terminal from the office operating system to the personal operating system.

In this embodiment of the present disclosure, when the foreground operating system of the terminal is different, the management personnel control the terminal in a different control manner, in other words, different foreground operating systems correspond to different control instructions. Therefore, when the foreground operating system of the terminal is changed, a control manner for controlling the terminal needs to be changed, in other words, a control instruction needs to be changed to control the terminal.

In order that the terminal can control the terminal in time according to a control instruction corresponding to a system identifier of the changed foreground operating system when the foreground operating system of the terminal is changed, the following optional design is further provided in the first aspect:

Optionally, after the controlling, by the terminal, the terminal according to the second control instruction, the method further includes: storing, by the terminal, a correspondence between the system identifier of the second operating system and the second control instruction; determining, by the terminal, that the foreground operating system of the terminal is changed, and if the changed foreground operating system is the second operating system, obtaining, by the terminal, the second control instruction from the correspondence between the system identifier of the second operating system and the second control instruction; and controlling, by the terminal, the terminal according to the second control instruction.

In the first aspect, the following optional design is also available: Optionally, the method further includes: receiving, by the terminal, third control information sent by the server, where the third control information carries a third control instruction but no system identifier, the third control instruction instructs to perform an indicated operation on the terminal, the third control information instructs to control the terminal according to the third control instruction when the foreground operating system of the terminal is a preset operating system, and the preset operating system is one of the at least two operating systems of the terminal; and determining, by the terminal, that the foreground operating system of the terminal is the preset operating system, and controlling, by the terminal, the terminal according to the third control instruction.

If there is only one operating system on the terminal, when entering control information on the server, the management personnel only need to add a control instruction to the control information, and do not need to add a system identifier of the operating system on the terminal to the control information.

There is only one operating system on the terminal and the operating system is always the foreground operating system of the terminal. Therefore, when the terminal receives the control information, the terminal controls the terminal according to the control instruction carried in the control information.

However, when there are a plurality of operating systems on the terminal, a system identifier usually needs to be added to control information, so that the terminal can control the terminal according to a control instruction carried in the control information when the terminal determines that the foreground operating system is an operating system corresponding to the system identifier. Otherwise, the terminal cannot determine, when the foreground operating system of the terminal is which operating system, to control the terminal according to the control instruction carried in the control information. Therefore, the terminal does not perform an operation of controlling the terminal according to the control instruction. In other words, when there is a plurality of operating systems on the terminal, it is usually not supported that the control information carries only a control instruction but no system identifier.

However, in this embodiment of the present disclosure, when there are a plurality of operating systems on the terminal, it is supported that the control information carries only a control instruction but no system identifier. When the control information carries the control instruction but no system identifier, the terminal may determine the control instruction as a control instruction used to control the terminal when the foreground operating system of the terminal is a preset operating system. The preset operating system is one of the at least two operating systems on the terminal. It is also supported that the control information carries both the control instruction and the system identifier. In this way, the terminal determines the control instruction as the control instruction used to control the terminal when the foreground operating system of the terminal is the operating system corresponding to the system identifier.

In the first aspect, the following optional design is also available: Optionally, the receiving, by a terminal, first control information sent by a server includes: detecting, by the terminal, whether a communication connection between the terminal and the server is normal; if the communication connection between the terminal and the server is normal, sending, by the terminal to the server, an obtaining request used for obtaining the first control information; and receiving, by the terminal, the first control information returned by the server according to the obtaining request.

In another embodiment of the present disclosure, a communication connection between the management server and the terminal is sometimes abnormal, and the management server cannot send the control information to the terminal when the communication connection is abnormal. In other words, the terminal cannot receive the control information. Therefore, to obtain the control information from the management server as quickly as possible and achieve a purpose of the management personnel, the terminal may detect whether the communication connection between the terminal and the management server is normal. When the communication connection between the terminal and the management server is normal, the terminal may send an obtaining request used to obtain the control information to the management server. The obtaining request further carries a terminal identifier of the terminal. When the management server receives the obtaining request, the management server may extract the terminal identifier from the obtaining request, obtain, based on the terminal identifier, a correspondence between the control information and the terminal identifier from a locally stored correspondence, obtain the control information from the correspondence, and send the control information to the terminal based on the terminal identifier. The terminal receives the control information returned by the management server according to the obtaining request.

In the first aspect, the following optional design is also available: Optionally, the method further includes: receiving, by the terminal, stop control information sent by the server, where the stop control information carries the first control instruction and the system identifier of the first operating system, and the stop control information instructs to stop controlling the terminal according to the first control instruction when the foreground operating system of the terminal is the first operating system; and deleting, by the terminal, the correspondence, between the system identifier of the first operating system and the first control instruction, that is stored on the terminal.

In another embodiment of the present disclosure, the management personnel may no longer need to enable the terminal to control the terminal according to the control instruction when the foreground operating system of the terminal is the target operating system. In this case, the management personnel may enter, on the management server, the terminal identifier of the terminal and the stop control information including the control instruction and the system identifier of the target operating system, and then submit the terminal identifier and the stop control information to the management server. The stop control information instructs to stop controlling the terminal according to the control instruction when the foreground operating system of the terminal is the target operating system. The management server sends the stop control information to the terminal based on the terminal identifier.

In the first aspect, the following optional design is also available: Optionally, the method further includes: the second operating system is a personal operating system, and the second control instruction instructs to prohibit from using a Wi-Fi device in the terminal; and the controlling, by the terminal, the terminal according to the second control instruction includes: powering off, by the terminal, the Wi-Fi device by using driver information of the Wi-Fi device in the terminal.

In the first aspect, the following optional design is also available: Optionally, the method further includes: the second operating system is an office operating system, the second control instruction is used to indicate that a Wi-Fi device in the terminal is allowed to be used, and only a preset access point can be connected when the Wi-Fi device in the terminal is used; and the controlling, by the terminal, the terminal according to the second control instruction includes: powering on, by the terminal, the Wi-Fi device by using driver information of the Wi-Fi device in the terminal, and setting a Wi-Fi access point identifier list of the office operating system by using an API in a system service of a container, where the container bears the office operating system, and the Wi-Fi access point identifier list includes only an identifier of the preset access point.

According to a second aspect of the embodiments of the present disclosure, a terminal control method is provided. The method includes: receiving, by a proxy server, control information and a terminal identifier, where the control information and the terminal identifier are sent by a management server communicatively connected to the proxy server, the control information carries a control instruction and a system identifier of a first operating system, the control instruction instructs to perform an indicated operation on a terminal corresponding to the terminal identifier, the operating system is one of at least two operating systems on the terminal, and the control information instructs to control the terminal according to the control instruction when a foreground operating system of the terminal is the first operating system; determining, by the proxy server, that a communication connection between the proxy server and the terminal is abnormal, and storing, by the proxy server, a correspondence between the control information and the terminal identifier; and after the communication connection between the proxy server and the terminal is normal, sending, by the proxy server, the control information to the terminal based on the terminal identifier.

In this embodiment of the present disclosure, the management server does not need to establish a communication connection to each terminal, but only needs to establish a communication connection to the proxy server. This reduces a quantity of communication connections that need to be established by the management server and saves communication resources of the management server.

In addition, if there is no proxy server, the management server needs to establish a communication connection to each terminal. When needing to send control information to a terminal, the management server needs to detect whether a communication connection between the management server and the terminal is normal. The management server can send the control information to the terminal only when the communication connection between the management server and the terminal is normal. When needing to separately send control information to a plurality of terminals, the management server needs to detect whether a communication connection between the management server and each of the plurality of terminals is normal. This increases system load of the management server. In this embodiment of the present disclosure, the management server does not need to establish a communication connection to each terminal, but only needs to establish a communication connection to the proxy server. The proxy server establishes a communication connection to each terminal. Therefore, when needing to separately send control information to a plurality of terminals, the management server only needs to learn whether the communication connection between the management server and the proxy server is normal, and does not need to learn whether the communication connection between the proxy server and each of the plurality of terminals is abnormal and does not need to detect whether the communication connection between the proxy server and each of the plurality of terminals is normal. This avoids increasing the system load of the management server.

In addition, in this embodiment of the present disclosure, communication protocols supported by the terminals may be different. Therefore, if there is no proxy server, the management server needs to support the communication protocols supported by all the terminals. In this way, the management server can communicate with each terminal. This increases system complexity of the management server. In this embodiment of the present disclosure, the management server only needs to communicate with the proxy server and does not need to communicate with each terminal. The management server only needs to support a communication protocol supported by the proxy server and does not need to support the communication protocols supported by all the terminals. This decreases the system complexity of the management server.

In this embodiment of the present disclosure, when the plurality of terminals need to be separately controlled, the control information does not need to be sent to each terminal, and the control information only needs to be sent to the proxy server. This implements unified control.

In this embodiment of the present disclosure, the communication connection between the proxy server and the terminal is sometimes abnormal. For example, the communication connection is temporarily disconnected or the terminal temporarily has no permission to use the communication connection. When the communication connection between the proxy server and the terminal is abnormal, the proxy server cannot send the control information to the terminal.

Therefore, when the proxy server receives the control information and the terminal identifier, where the control information and the terminal identifier are sent by the management server, the proxy server needs to detect whether the communication connection between the proxy server and the terminal is abnormal. If the communication connection is normal, the proxy server may send the control information to the terminal based on the terminal identifier at this time. If the communication connection is abnormal, the proxy server cannot send the control information to the terminal based on the terminal identifier at this time. However, although the proxy server cannot send the control information to the terminal based on the terminal identifier at this time, in order that the proxy server can send the control information to the terminal based on the terminal identifier after the communication connection is normal, the proxy server may locally store the correspondence between the control information and the terminal identifier. Then, when the proxy server detects that the communication connection between the proxy server and the terminal is normal, the proxy server obtains the control information and the terminal identifier from the correspondence, and sends the control information to the terminal based on the terminal identifier. In this way, reliability of sending the control information to the terminal is improved.

In the second aspect, the following optional design is also available: Optionally, the method further includes: receiving, by the proxy server, stop control information and the terminal identifier of the terminal, where the stop control information and the terminal identifier of the terminal are sent by the management server, the stop control information carries the control instruction and the system identifier of a second operating system, and the stop control information instructs to stop controlling the terminal according to the control instruction when the foreground operating system of the terminal is the second operating system; and sending, by the proxy server, the stop control information to the terminal based on the terminal identifier, so that the terminal deletes a correspondence, between the system identifier of the second operating system and the control instruction, that is stored on the terminal.

Further, in this embodiment of the present disclosure, management personnel may no longer need to enable the terminal to control the terminal according to the control instruction when the foreground operating system of the terminal is a target operating system.

If the management personnel no longer needs to enable the terminal to control the terminal according to the control instruction when the foreground operating system of the terminal is the target operating system, the management personnel may enter, on the management server, the terminal identifier of the terminal and the stop control information, add the control instruction and a system identifier of the target operating system to the stop control information, and then submit the terminal identifier and the stop control information to the management server. The stop control information instructs to stop controlling the terminal according to the control instruction when the foreground operating system of the terminal is the target operating system. The management server sends the stop control information to the proxy server based on the terminal identifier. When receiving the terminal identifier and the stop control information, where the terminal identifier and the stop control information are sent by the management server, the proxy server sends the stop control information to the terminal based on the terminal identifier. When receiving the stop control information sent by the proxy server, the terminal extracts the system identifier of the target operating system and the control instruction from the stop control information, and locally searches for a correspondence between the system identifier of the target operating system and the control instruction, and deletes the correspondence.

In this way, when the foreground operating system of the terminal is changed to the target operating system, the terminal cannot obtain the control instruction corresponding to the system identifier of the target operating system. Therefore, the terminal does not control the terminal according to the control instruction.

In the second aspect, the following optional design is also available: Optionally, the sending, by the proxy server, the control information to the terminal based on the terminal identifier includes: determining, by the proxy server, that an information format of the control information is not an information format supported by the terminal, converting, by the proxy server, the information format of the control information to the information format supported by the terminal; and sending, by the proxy server, the control information in the information format supported by the terminal to the terminal based on the terminal identifier.

In the present disclosure, the information format of the control information sent by the management server to the proxy server may be inconsistent with the information format supported by the terminal. When the information format of the control information sent by the management server to the proxy server is inconsistent with the format of the information supported by the terminal, the terminal cannot locally identify the control information, to be specific, cannot identify the control instruction and the system identifier in the control information. Further, the terminal cannot execute the control instruction and cannot control the terminal according to the control instruction when the foreground operating system of the terminal is the target operating system. Therefore, when receiving the control information sent by the management server, the proxy server needs to detect whether the information format of the control information is the information format supported by the terminal. When the information format of the control information is not the information format supported by the terminal, the proxy server converts the information format of the control information to the information format supported by the terminal.

Then, the proxy server sends, based on the terminal identifier, the control information whose information format is converted to the terminal. The terminal may locally execute the control instruction in the control information whose information format is converted, to control the terminal according to the control instruction when the foreground operating system of the terminal is the target operating system.

According to a third aspect of the embodiments of the present disclosure, a terminal is provided. The terminal has functions of implementing actions of the terminal in the method design in the first aspect. The functions may be implemented by hardware, or may be implemented by executing corresponding software by hardware. The hardware or software includes one or more modules corresponding to the functions.

In the third aspect, the following optional design is also available: Optionally, a structure of the terminal includes a receiving unit and a processing unit. The receiving unit is configured to support communication between the terminal and a server, receive information or an instruction in the foregoing method in the first aspect. The processing unit is configured to execute corresponding functions performed by the terminal in the foregoing method. The terminal may further include a memory. The memory is configured to be coupled to the processing unit and the memory includes program instructions and data for the terminal.

According to a fourth aspect of the embodiments of the present disclosure, a proxy server is provided. The proxy server has functions of implementing actions of the proxy server in the method design in the second aspect. The functions may be implemented by hardware, or may be implemented by executing corresponding software by hardware. The hardware or software includes one or more modules corresponding to the functions.

In the fourth aspect, the following optional design is also available: Optionally, a structure of the proxy server includes a receiving unit, a processing unit, and a sending unit. The receiving unit is configured to support communication between the proxy server and a management server, and receive information or an instruction in the foregoing method in the second aspect. The sending unit is configured to support communication between the proxy server and a terminal, and send information or an instruction in the foregoing method to the terminal. The processing unit is configured to execute corresponding functions performed by the proxy server in the foregoing method. The proxy server may further include a memory. The memory is configured to be coupled to the processing unit and the memory includes program instructions and data for the proxy server.

It should be understood that, the foregoing general description and the following detailed description are merely illustrative and explanative, and are not intended to limit the embodiments of the present disclosure.

BRIEF DESCRIPTION OF DRAWINGS

The drawings herein are incorporated in this specification and constitute a part of this specification, show embodiments conforming to the present disclosure, and explain principles of the embodiments of the present disclosure together with this specification.

DESCRIPTION OF EMBODIMENTS

Example embodiments are described in detail herein, and examples of the example embodiments are shown in the accompanying drawings. When the following description relates to the accompanying drawings, unless specified otherwise, same numbers in different accompanying drawings represent a same or similar element. Implementations described in the following example embodiments do not represent all implementations consistent with the embodiments of the present disclosure. On the contrary, they are only examples of apparatuses and methods that are described in the appended claims in detail and that are consistent with some aspects of the embodiments of the present disclosure.

Figure 1:
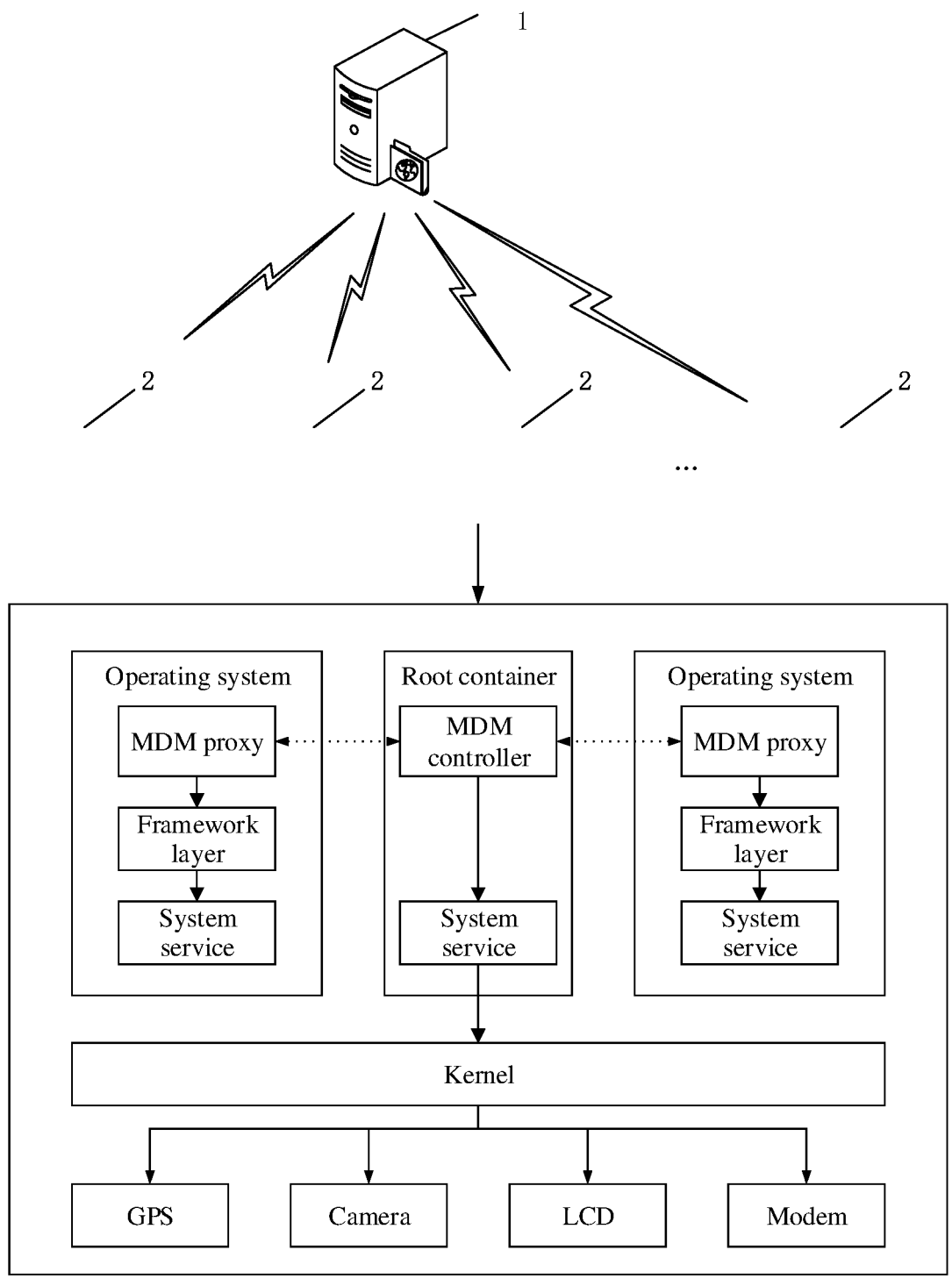
FIG. 1 is a schematic diagram of a terminal control system according to an example embodiment.

FIG. 1 is a schematic diagram of a terminal control system according to an example embodiment. Referring to FIG. 1, the system includes a management server 1 and at least one terminal 2, and the management server is communicatively connected to each terminal 2, for example, by using a fourth generation (4G) connection or a Wi-Fi connection. The terminal 2 may be a personal computer, such as a mobile phone, a tablet computer, a notebook computer, or a desktop computer, or may be another computing device having a computing capability. The management server may exchange data with any terminal 2.

Figure 2:
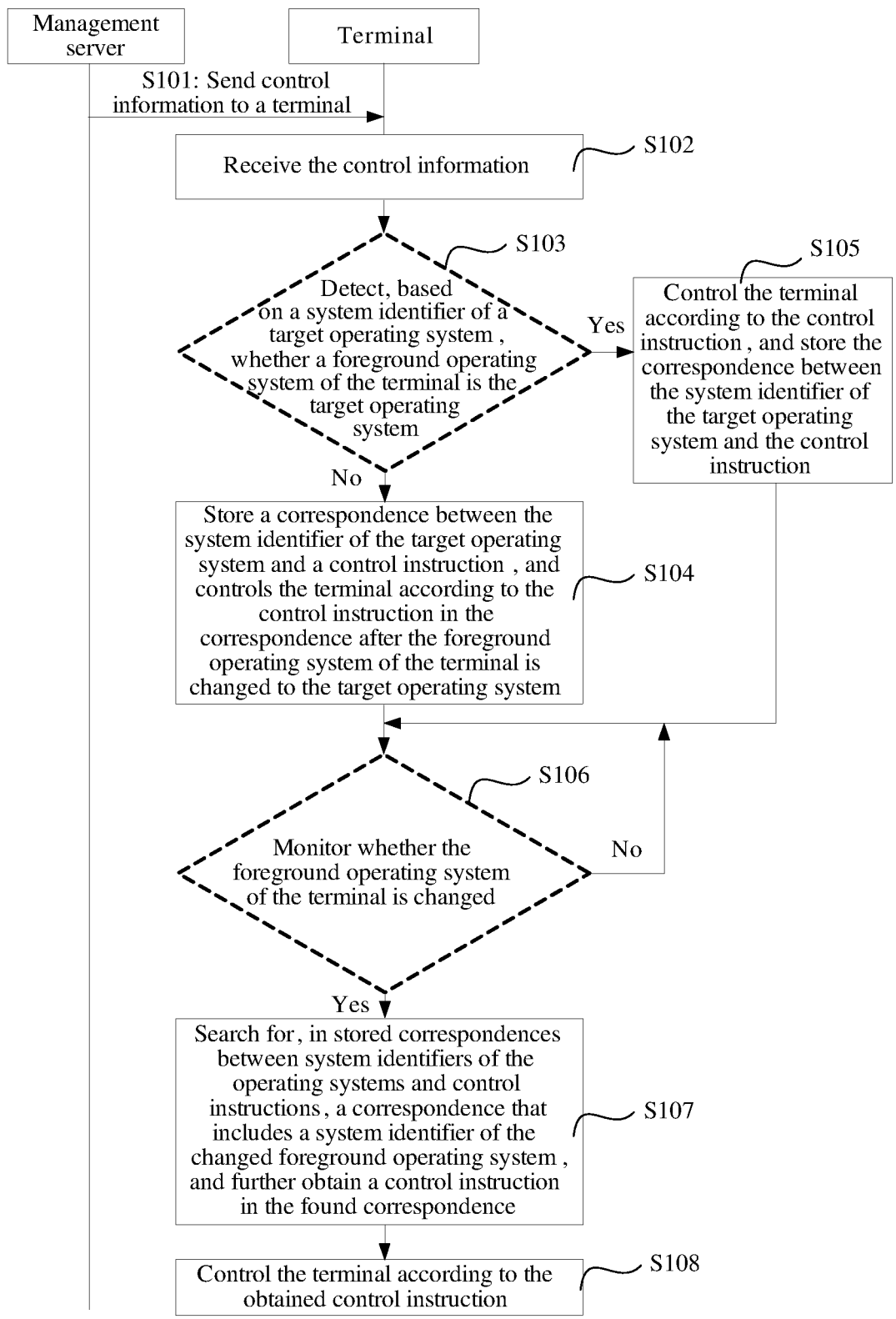
FIG. 2 is a flowchart of a terminal control method according to an example embodiment.

FIG. 2 is a flowchart of a terminal control method according to an example embodiment. As shown in FIG. 2, the method is applied to the terminal control system shown in FIG. 1. The method includes the following steps.

Step S101: A management server sends control information to a terminal, where the control information carries a control instruction and a system identifier of a target operating system, the control instruction instructs to perform an indicated operation on the terminal, the target operating system is one of at least two operating systems on the terminal, and the control information instructs to control the terminal according to the control instruction when a foreground operating system of the terminal is the target operating system.

The terminal in this embodiment of the present disclosure is any terminal 2 shown in FIG. 1.

In this embodiment of the present disclosure, the at least two operating systems are installed on the terminal. Each operating system has a system identifier, and a system identifier of an operating system is different from a system identifier of another operating system.

If the at least two operating systems are installed on the terminal, one operating system is a foreground operating system, and other operating systems are background operating systems. Both the foreground operating system and the background operating systems occupy computing resources and storage resources of the terminal, and may run a plurality of services. However, the foreground operating system and the background operating system occupy different display resources. The foreground operating system may output content stored by a display card in a memory to a terminal screen and display the content to a user, whereas the background operating system cannot output content to the screen.

In this embodiment of the present disclosure, if the at least two operating systems are installed on the terminal, an operation interface of only one operating system instead of a plurality of operating systems is displayed on the terminal screen at any moment. Therefore, in this embodiment of the present disclosure, the foreground operating system of the terminal at any moment refers to an operating system that currently occupies a display resource of the terminal. In other words, the foreground operating system is an operating system corresponding to an operation interface currently displayed on the terminal screen. From the perspective of a terminal user, the terminal user may interact with the foreground operating system by using the terminal screen, and an operation interface of the background operating system is invisible to the terminal user. The terminal user may switch the foreground operating system by pressing a special key on the terminal or sliding along a special track on the screen. When receiving an event triggered by the foregoing operation, hardware of the terminal switches the foreground operating system.

If only one operating system is installed on the terminal, the foreground operating system is the unique operating system on the terminal.

For example, two operating systems are installed on the terminal: an office operating system and a personal operating system. When the terminal user uses the terminal to work, the terminal user may set the office operating system as a foreground operating system of the terminal. An operation interface of the office operating system is displayed on the terminal screen, and the terminal user may work in the office operating system. In this case, the personal operating system is a background operating system. When the terminal user uses the terminal to process a private service irrelevant to work, the terminal user may set the personal operating system as the foreground operating system of the terminal. Then, an operation interface of the personal operating system is displayed on the terminal screen. The terminal user may process the private service irrelevant to work in the personal operating system. In this case, the office operating system is the background operating system.

In this embodiment of the present disclosure, at any moment if management personnel need to enable the terminal to control the terminal according to the control instruction when the foreground operating system of the terminal is the target operating system, regardless of whether the foreground operating system of the terminal is the target operating system at this time, the management personnel may use the management server to send the control information to the terminal. When the terminal receives the control information, the terminal may extract the control instruction and the system identifier of the target operating system from the control information, and control the terminal according to the control instruction when the foreground operating system of the terminal is the target operating system. In this way, a purpose of the management personnel is achieved.

The management personnel may enter, on the management server, the control information that includes the control instruction and the system identifier of the target operating system.

There are a plurality of terminals that are communicatively connected to the management server. To enable the management server to specify that the control information is control information acting on the terminal, at the same time when entering the control information on the management server, the management personnel further need to enter a terminal identifier of the terminal on the management server, and submit the control information and the terminal identifier to the management server. Then, the management server sends the control information to the terminal based on the terminal identifier.

In this embodiment of the present disclosure, all terminals separately connected to the management server have different terminal identifiers. The terminal identifier may be an international mobile subscriber identity (IMSI) or an International Mobile Equipment Identity (IMEI) of the terminal. This is not limited in this embodiment of the present disclosure.

In this embodiment of the present disclosure, the control instruction may be a message for controlling power-off of a Wi-Fi device in the terminal, or a message for controlling power-on of a Wi-Fi device in the terminal and for connecting only to a preset access point when the terminal is connected to an access point.

In this embodiment of the present disclosure, the management server may exchange data with the terminal over Transmission Control Protocol/Internet Protocol (TCP/IP). Therefore, in this step, the management server may send the control information to the terminal over TCP/IP. Specifically, after connecting to a network, the terminal initiates a TCP long connection request to the management server based on a pre-stored IP address and port of the management server. After receiving the TCP long connection request, the management server establishes a TCP connection to the terminal and sends the control information to the terminal by using the established TCP connection.

In this embodiment of the present disclosure, a communication connection between the management server and the terminal is sometimes abnormal. For example, the communication connection is temporarily disconnected or the terminal temporarily has no permission to use the communication connection. When the communication connection between the management server and the terminal is abnormal, the management server cannot send the control information to the terminal.

Therefore, when the management server receives the control information and the terminal identifier that are submitted by the management personnel, the management server needs to detect whether the communication connection between the management server and the terminal is abnormal. If the communication connection is normal, the management server may send the control information to the terminal based on the terminal identifier at this time. If the communication connection is abnormal, the management server cannot send the control information to the terminal based on the terminal identifier at this time. However, although the management server cannot send the control information to the terminal based on the terminal identifier at this time, in order that the management server can send the control information to the terminal based on the terminal identifier after the communication connection is normal, the management server may locally store a correspondence between the control information and the terminal identifier. Then, when the management server detects that the communication connection between the management server and the terminal is normal, the management server obtains the control information and the terminal identifier from the correspondence, and sends the control information to the terminal based on the terminal identifier. In this way, reliability of sending the control information to the terminal is improved.

Further, after the management server sends the control information to the terminal based on the terminal identifier, to save local storage space of the management server, the management server may locally delete the correspondence between the control information and the terminal identifier.

Step S102: The terminal receives the control information sent by the management server.

In another embodiment of the present disclosure, the communication connection between the management server and the terminal is sometimes abnormal, and the management server cannot send the control information to the terminal when the communication connection is abnormal. In other words, the terminal cannot receive the control information. Therefore, to obtain the control information from the management server as quickly as possible and achieve the purpose of the management personnel, the terminal may detect whether the communication connection between the terminal and the management server is normal. When the communication connection between the terminal and the management server is normal, the terminal may send an obtaining request used to obtain the control information to the management server. The obtaining request further carries a terminal identifier of the terminal. When the management server receives the obtaining request, the management server may extract the terminal identifier from the obtaining request, obtain, based on the terminal identifier, the correspondence between the control information and the terminal identifier from a locally stored correspondence, obtain the control information from the correspondence, and send the control information to the terminal based on the terminal identifier. The terminal receives the control information returned by the management server according to the obtaining request.

Step S103: The terminal detects, based on the system identifier of the target operating system, whether the foreground operating system of the terminal is the target operating system.

When receiving the control information, the terminal may extract the system identifier of the target operating system from the control information, obtain a system identifier of the foreground operating system on the terminal, and compare whether the system identifier of the foreground operating system on the terminal is the same as the system identifier of the target operating system. When the system identifier of the foreground operating system of the terminal is the same as the system identifier of the target operating system, the terminal determines that the foreground operating system of the terminal is the target operating system, and performs step S104. When the system identifier of the foreground operating system of the terminal is different from the system identifier of the target operating system, the terminal determines that the foreground operating system of the terminal is not the target operating system, and performs step S105.

In this embodiment of the present disclosure, the terminal may allocate a foreground operating system identifier field in a local cache. The foreground operating system identifier field is used to store the system identifier of the foreground operating system of the terminal. When the terminal displays an operation interface of an operating system on the screen, the terminal stores a system identifier of the operating system in the foreground operating system identifier field. When the terminal changes the operation interface displayed on the screen from the operation interface of the operating system to an operation interface of another operating system, the terminal deletes the system identifier of the operating system from the foreground operating system identifier field, and stores a system identifier of the another operating system in the foreground operating system identifier field. In other words, in this embodiment of the present disclosure, at any moment, an operating system corresponding to a system identifier stored in the foreground operating system identifier field is the foreground operating system of the terminal at this time.

Therefore, in this step, the terminal may obtain the system identifier stored in the foreground operating system identifier field in the local cache, and use the system identifier as the system identifier of the foreground operating system on the terminal.

Step S104: If the terminal determines that the foreground operating system of the terminal is not the target operating system, the terminal stores a correspondence between the system identifier of the target operating system and the control instruction, and controls the terminal according to the control instruction in the correspondence after the foreground operating system of the terminal is changed to the target operating system.

In this embodiment of the present disclosure, the control information instructs to control the terminal according to the control instruction when the foreground operating system of the terminal is the target operating system. Therefore, when the foreground operating system of the terminal is not the target operating system, the terminal cannot control the terminal according to the control instruction.

However, when the terminal user uses the terminal at a later time, the terminal user may change the foreground operating system of the terminal to the target operating system. In order that the terminal can control the terminal in time according to the control instruction when the foreground operating system of the terminal is changed to the target operating system, if the terminal determines, based on the system identifier of the target operating system, that the foreground operating system of the terminal is not the target operating system, the terminal may store the correspondence between the system identifier of the target operating system and the control instruction. In this way, if the foreground operating system of the terminal is changed to the target operating system, the terminal may obtain the control instruction from the correspondence, and control the terminal according to the control instruction. This achieves the purpose of the management personnel.

Step S105: If the terminal determines that the foreground operating system of the terminal is the target operating system, the terminal controls the terminal according to the control instruction, and stores the correspondence between the system identifier of the target operating system and the control instruction.

In this embodiment of the present disclosure, the control information instructs to control the terminal according to the control instruction when the foreground operating system of the terminal is the target operating system. Therefore, when the foreground operating system of the terminal is the target operating system, the terminal may control the terminal according to the control instruction. This achieves the purpose of the management personnel.

In this embodiment of the present disclosure, there are a plurality of types of control instructions, for example, an instruction for updating a working state of a hardware device in the terminal, an instruction for updating a system policy of a target operating system, and an instruction for updating data in a target operating system.

The hardware device in the terminal includes a sounding device, a Bluetooth device, a Wi-Fi device, a microphone, and the like in the terminal. Driver information of each hardware device in the terminal is installed on the terminal, and the driver information is used to control a working state of the hardware device. For example, the hardware device is prohibited from working or allowed to work.

The terminal may create a plurality of containers in the Linux kernel based on a namespace mechanism of Linux, and allocate an independent namespace to each container.

One of the created containers is a root container, and the root container includes at least an mobile device management (MDM) controller and a system service.

Other containers are containers used to bear an operating system. An operating system may run on each container, where each container is used to bear an operating system. A namespace of the container provides kernel support for the operating system running on the container. Each container for running the operating system includes at least an MDM proxy or agent and an application program interface (API).

The MDM controller in the root container is configured to receive the control information sent by the management server to the terminal. Then, the MDM controller extracts the control instruction and the system identifier of the target operating system from the control information. When the foreground operating system of the terminal is the target operating system, and if the control instruction is an instruction for instructing to update a working state of a hardware device in the terminal, the MDM controller may invoke driver information of the hardware device in the kernel by using an API. The API is an API of the system service in the root container. Then, the MDM controller modifies the driver information of the hardware device according to the control instruction, so as to update the working state of the hardware device.

In this embodiment of the present disclosure, the driver information of the hardware device includes an adaptation layer and the adaptation layer includes a check field that is used to store a name of a container. Only a container corresponding to a name of a container stored in the check field can modify the driver information of the hardware device, and a container corresponding to a name of a container that is not stored in the check field cannot modify the driver information of the hardware device. This avoids a conflict that the root container and another container perform an operation on the driver information of the hardware device at the same time.

If the control instruction is an instruction for instructing to update a system policy of the target operating system, the MDM controller sends the control instruction to an MDM proxy in a container, where the container bears the target operating system, and the MDM proxy receives the control instruction and modifies a system policy of the target operating system by using an API. The API is an API in a system service in the container, where the container bears the target operating system.

If the control instruction is an instruction for instructing to update data of the target operating system, the MDM controller sends the control instruction to an MDM proxy in a container, where the container bears the target operating system, and the MDM proxy receives the control instruction and modifies the data of the target operating system by using an API. The API is an API in a system service in the container, where the container bears the target operating system.

The present disclosure uses an example for description, but this example does not constitute a limitation to the protection scope of the present disclosure. For example, operating systems on a terminal include an office operating system and a personal operating system.

In one embodiment of the present disclosure, a target operating system is the personal operating system, and a control instruction instructs to prohibit from using a Wi-Fi device in the terminal. In this case, the control instruction is an instruction for instructing to update a working state of a hardware device in the terminal.

Therefore, when a foreground operating system of the terminal is the personal operating system, the terminal may power off the Wi-Fi device by using driver information of the Wi-Fi device in the terminal.

Specifically, an MDM controller in a root container invokes an API in a Wi-Fi service in the root container to invoke the driver information of the Wi-Fi device in a kernel, and modifies the driver information of the Wi-Fi device according to the control instruction, so that the Wi-Fi device is powered off. After the Wi-Fi device is powered off, a terminal user cannot use the Wi-Fi device in the terminal.

In another embodiment of the present disclosure, a target operating system is the office operating system, a control instruction is used to indicate that a Wi-Fi device in the terminal is allowed to be used, and only a preset access point can be connected when the Wi-Fi device in the terminal is used. In this case, the control instruction includes two sub-instructions: a first sub-instruction and a second sub-instruction. The first sub-instruction is an instruction for instructing to update a working state of a hardware device in the terminal, and the second sub-instruction is an instruction for instructing to update a system policy of the target operating system.

Therefore, when the foreground operating system of the terminal is the office operating system, the terminal powers on the Wi-Fi device by using driver information of the Wi-Fi device in the terminal, and sets a Wi-Fi access point identifier list of the office operating system by using an API. The API is an API in a system service in a container, where the container bears the target operating system, and the Wi-Fi access point identifier list includes only an identifier of the preset access point.

Specifically, an MDM controller in a root container invokes the driver information of the Wi-Fi device in a kernel by using the API, where the API is an API in a Wi-Fi service in the root container, and modifies the driver information of the Wi-Fi device according to the first sub-instruction, so that the Wi-Fi device is powered off. After the Wi-Fi device is powered off, a terminal user cannot use the Wi-Fi device in the terminal.

In addition, the MDM controller sends the second sub-instruction to an MDM proxy in the container, where the container bears the office operating system. The MDM proxy receives the second sub-instruction, and invokes the API to set the Wi-Fi access point identifier list. The API is the API in the system service in the container, where the container bears the office operating system. Therefore, when the foreground operating system of the terminal is the office operating system and the terminal user connects to the access point by using the Wi-Fi device, the terminal displays only the Wi-Fi access point identifier list, so that the terminal can connect only to the preset access point by using the Wi-Fi device.

In another embodiment of the present disclosure, because there are the at least two operating systems on the terminal, when the terminal user uses the terminal, the user may change the foreground operating system of the terminal. For example, the terminal user changes the foreground operating system of the terminal from the personal operating system to the office operating system, or changes the foreground operating system of the terminal from the office operating system to the personal operating system. When the foreground operating system of the terminal is different, the management personnel need to control the terminal in a different control manner, in other words, different foreground operating systems correspond to different control instructions. Therefore, if the foreground operating system of the terminal is changed, a control manner for controlling the terminal needs to be changed, in other words, a control instruction needs to be changed to control the terminal.

If the terminal user uses the terminal at a later time, the terminal user may change the foreground operating system of the terminal from the target operating system to another operating system, and then changes the foreground operating system of the terminal from the another operating system to the target operating system again. In order to control the terminal again in time according to the control instruction when the foreground operating system of the terminal is changed from the another operating system to the target operating system, in this step, after the terminal controls the terminal according to the control instruction, the terminal further needs to store the correspondence between the system identifier of the target operating system and the control instruction. In this way, if the foreground operating system of the terminal is changed from the another operating system to the target operating system, the terminal may obtain the control instruction in the correspondence based on the system identifier of the target operating system, and control the terminal again according to the control instruction. This achieves the purpose of the management personnel.

In this embodiment of the present disclosure, any terminal communicatively connected to the management server may simultaneously receive a plurality of pieces of control information separately sent by the management server. A control instruction carried in each piece of control information is used to control the terminal when the foreground operating system of the terminal is a different operating system. In other words, the terminal may simultaneously receive at least two control instructions, and each of the at least two control instructions is a control instruction used to control the terminal when the foreground operating system of the terminal is a different operating system. However, when the terminal receives the at least two control instructions, only one of the at least two operating systems of the terminal is the foreground operating system of the terminal, and other operating systems are background operating systems of the terminal.

Therefore, it is assumed that a control instruction carried in any piece of control information that is sent by the management server and received by the terminal is a control instruction used to control the terminal when the foreground operating system of the terminal is the target operating system, and the target operating system is one of the at least two operating systems on the terminal. When the foreground operating system of the terminal is not the target operating system, the terminal does not control the terminal according to the control instruction. Then, the terminal may store the correspondence between the system identifier of the target operating system and the control instruction, so that after the foreground operating system of the terminal is changed to the target operating system, the terminal may further obtain the control instruction according to the correspondence, and control the terminal according to the control instruction. In this way, the management personnel can control the terminal when the foreground operating system of the terminal is the target operating system, and perform accurate differentiated management and control on the terminal in a plurality of different operating systems.

Because there are at least two operating systems on the terminal, when the terminal user uses the terminal, the user may change the foreground operating system of the terminal. For example, the terminal user changes the foreground operating system of the terminal from the personal operating system to the office operating system, or changes the foreground operating system of the terminal from the office operating system to the personal operating system.

In this embodiment of the present disclosure, when the foreground operating system of the terminal is different, the management personnel control the terminal in a different control manner, in other words, different foreground operating systems correspond to different control instructions. Therefore, if the foreground operating system of the terminal is changed, a control manner for controlling the terminal needs to be changed, in other words, a control instruction needs to be changed to control the terminal.

In order that the terminal can control the terminal in time according to a control instruction corresponding to a system identifier of the changed foreground operating system when the foreground operating system of the terminal is changed, this embodiment of the present disclosure further includes the following process:

Step S106: The terminal monitors whether the foreground operating system of the terminal is changed.

In this embodiment of the present disclosure, when any one of the at least two operating systems on the terminal is the foreground operating system of the terminal, a foreground operating system change interface is displayed in an operation interface of the operating system, the terminal user may change the foreground operating system of the terminal by using the foreground operating system change interface. For example, the foreground operating system change interface may be a button. When the user clicks the button, system identifiers of all of the at least two operating systems on the terminal are displayed in the operation interface of the operating system, the user may select a system identifier from the displayed system identifiers of all the operating systems, and then the terminal changes the foreground operating system of the terminal to an operating system corresponding to the system identifier selected by the user. Further, the terminal may replace a system identifier stored in the foreground operating system identifier field in the local cache with the system identifier selected by the user. For example, the terminal deletes the system identifier currently stored in the foreground operating system identifier field in the local cache, and stores the system identifier selected by the user in the foreground operating system identifier field. This is the same for each of other operating systems on the terminal.

Therefore, in this step, the terminal may detect whether a replacement event occurs in the foreground operating system identifier field in the cache of the terminal. The replacement event includes an event of deleting a system identifier and an event of storing a system identifier that occur in a sequence. When a replacement event occurs in the foreground operating system identifier field, it is determined that the foreground operating system of the terminal is changed. When no replacement event occurs in the foreground operating system identifier field, it is determined that the foreground operating system of the terminal is not changed.

When the foreground operating system of the terminal is changed, in step S107, the terminal searches for, in stored correspondences between system identifiers of the operating systems and control instructions, a correspondence that includes a system identifier of the changed foreground operating system, and further obtains a control instruction in the found correspondence.

In this embodiment of the present disclosure, when the foreground operating system of the terminal is changed, the terminal may obtain the system identifier of the changed foreground operating system, for example, obtain a system identifier currently stored in the foreground operating system identifier field in the local cache, and use it as the system identifier of the changed foreground operating system of the terminal. Then, the terminal searches for, in the stored correspondences between the system identifiers of the operating systems and the control instructions, the correspondence that includes the system identifier of the changed foreground operating system, and further obtains the control instruction in the found correspondence.

When the foreground operating system of the terminal is not changed, the terminal returns to step S106.

Step S108: The terminal controls the terminal according to the obtained control instruction.

Further, in another embodiment of the present disclosure, the management personnel may no longer need to enable the terminal to control the terminal according to the control instruction when the foreground operating system of the terminal is the target operating system. In this case, the management personnel may enter, on the management server, the terminal identifier of the terminal and the stop control information including the control instruction and the system identifier of the target operating system, and submit the terminal identifier and the stop control information to the management server. The stop control information instructs to stop controlling the terminal according to the control instruction when the foreground operating system of the terminal is the target operating system. The management server sends the stop control information to the terminal based on the terminal identifier.

The terminal receives the stop control information sent by the management server, extracts the system identifier of the target operating system and the control instruction from the stop control information, and deletes the correspondence, between the system identifier of the target operating system and the control instruction, that is stored on the terminal.

In this way, after the foreground operating system of the terminal is changed to the target operating system, the terminal cannot obtain the control instruction according to the correspondence. Therefore, the terminal does not control the terminal according to the control instruction when the foreground operating system of the terminal is the target operating system.

Figure 3:
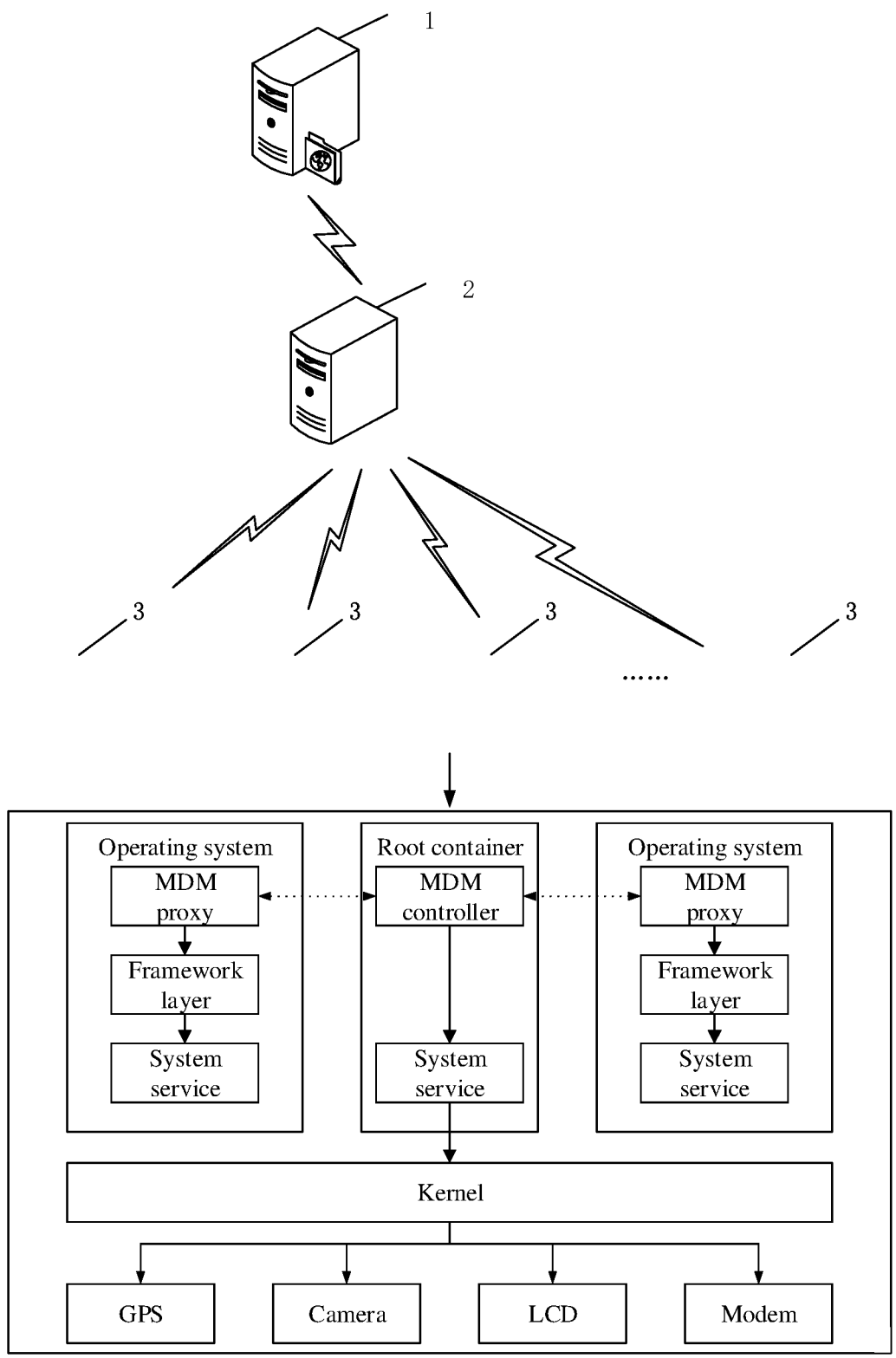
FIG. 3 is a schematic diagram of a terminal control system according to an example embodiment.

FIG. 3 is a schematic diagram of a terminal control system according to an example embodiment. Referring to FIG. 3, the system includes a management server 1, a proxy server 2, and at least one terminal 3. The management server 1 is communicatively connected to the proxy server 2. The proxy server 2 is communicatively connected to each terminal 3, for example, by using a 4G connection, or a Wi-Fi connection. The terminal 3 may be a personal computer, such as a mobile phone, a tablet computer, a notebook computer, or a desktop computer, or may be another computing device having a computing capability. The management server 1 and the proxy server 2 may exchange data, and the proxy server 2 and any terminal 3 may also exchange data.

Figure 4A:
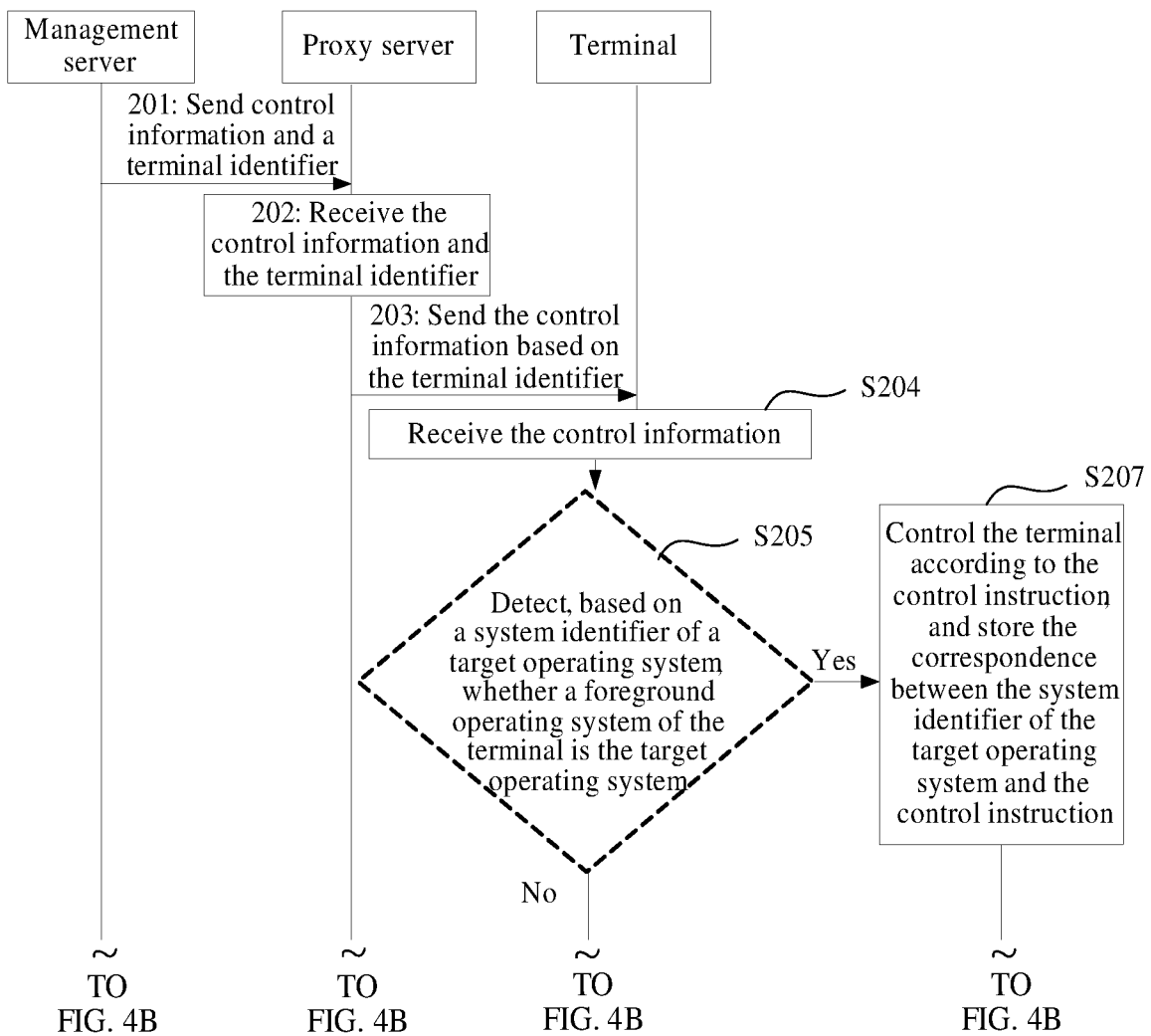
FIG. 4A and FIG. 4B are a flowchart of a terminal control method according to an example embodiment.
Figure 4B:
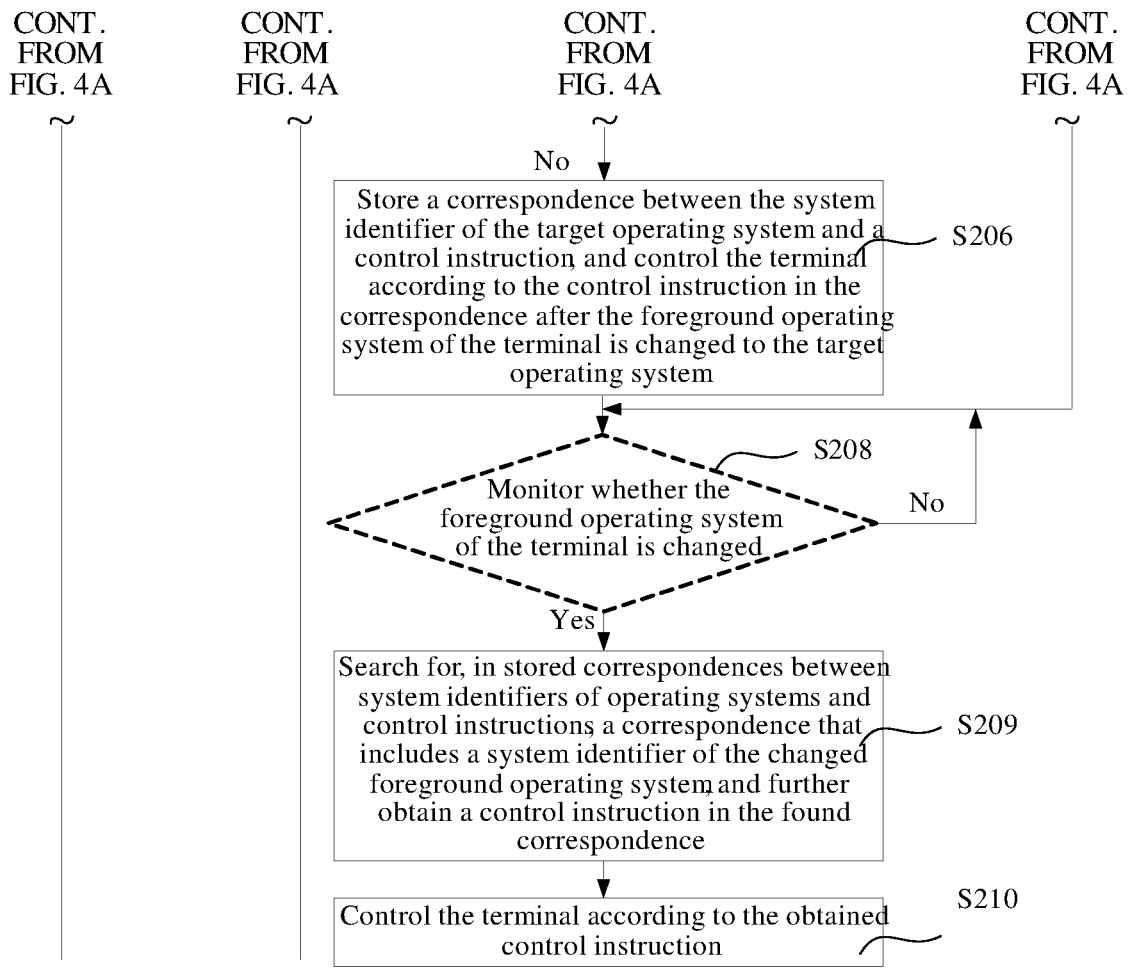

FIG. 4A and FIG. 4B are a flowchart of a terminal control method according to an example embodiment. As shown in FIG. 4A and FIG. 4B, the method is applied to the terminal control system shown in FIG. 3. The method includes the following steps.

Step S201: A management server sends control information and a terminal identifier to a proxy server, where the control information carries a control instruction and a system identifier of a target operating system, the control instruction instructs to perform an indicated operation on a terminal, the target operating system is one of at least two operating systems on the terminal, and the control information instructs to control the terminal according to the control instruction when a foreground operating system of the terminal is the target operating system.

The terminal in this embodiment of the present disclosure is any terminal 3 shown in FIG. 3.

In this embodiment of the present disclosure, the at least two operating systems are installed on the terminal. Each operating system has a system identifier, and a system identifier of an operating system is different from a system identifier of another operating system.

If the at least two operating systems are installed on the terminal, one operating system is a foreground operating system, and other operating systems are background operating systems. Both the foreground operating system and the background operating systems occupy computing resources and storage resources of the terminal, and may run a plurality of services. However, the foreground operating system and the background operating system occupy different display resources. The foreground operating system may output content stored by a display card in a memory to a terminal screen and display the content to a user, whereas the background operating system cannot output content to the screen.

In this embodiment of the present disclosure, if the at least two operating systems are installed on the terminal, an operation interface of only one operating system instead of a plurality of operating systems is displayed on the terminal screen at any moment. Therefore, in this embodiment of the present disclosure, the foreground operating system of the terminal at any moment refers to an operating system that currently occupies a display resource of the terminal. In other words, the foreground operating system is an operating system corresponding to an operation interface currently displayed on the terminal screen. From the perspective of a terminal user, the terminal user may interact with the foreground operating system by using the terminal screen, and an operation interface of the background operating system is invisible to the terminal user. The terminal user may switch the foreground operating system by pressing a special key on the terminal or sliding along a special track on the screen. When receiving an event triggered by the foregoing operation, hardware of the terminal switches the foreground operating system.

If only one operating system is installed on the terminal, the foreground operating system is the unique operating system on the terminal.

For example, two operating systems are installed on the terminal: an office operating system and a personal operating system. When the terminal user uses the terminal to work, the terminal user may set the office operating system as a foreground operating system of the terminal. An operation interface of the office operating system is displayed on the terminal screen, and the terminal user may work in the office operating system. In this case, the personal operating system is a background operating system. When the terminal user uses the terminal to process a private service irrelevant to work, the terminal user may set the personal operating system as the foreground operating system of the terminal. Then, an operation interface of the personal operating system is displayed on the terminal screen. The terminal user may process the private service irrelevant to work in the personal operating system. In this case, the office operating system is the background operating system.

In this embodiment of the present disclosure, at any moment if management personnel need to enable the terminal to control the terminal according to the control instruction when the foreground operating system of the terminal is the target operating system, regardless of whether the foreground operating system of the terminal is the target operating system at this time, the management personnel may use the management server and the proxy server to send the control information to the terminal. When the terminal receives the control information, the terminal may extract the control instruction and the system identifier of the target operating system from the control information, and control the terminal according to the control instruction when the foreground operating system of the terminal is the target operating system. In this way, a purpose of the management personnel is achieved.

The management personnel may enter, on the management server, the control information that includes the control instruction and the system identifier of the target operating system.

There are a plurality of terminals that are communicatively connected to the management server. To enable the management server to specify that the control information is control information acting on the terminal, at the same time when entering the control information on the management server, the management personnel further need to enter a terminal identifier of the terminal on the management server, and submit the control information and the terminal identifier to the management server. Then, the management server sends the control information and the terminal identifier to the proxy server, so that the proxy server may send the control information to the terminal based on the terminal identifier.

In this embodiment of the present disclosure, all terminals separately connected to the proxy server have different terminal identifiers. The terminal identifier may be an IMSI or an IMEI of the terminal. This is not limited in this embodiment of the present disclosure.

In this embodiment of the present disclosure, the control instruction may be a message for controlling power-off of a Wi-Fi device in the terminal, or a message for controlling power-on of a Wi-Fi device in the terminal and for connecting only to a preset access point when the terminal is connected to an access point.

In this embodiment of the present disclosure, a Restful interface based on the Hyper Text Transfer Protocol Secure (HTTPS) protocol is disposed on the management server. A Restful interface based on the HTTPS protocol is also disposed on the proxy server. Therefore, the management server and the proxy server may exchange data by using the HTTPS protocol. In this step, the management server may send the control information and the terminal identifier to the proxy server by using the HTTPS protocol.

The management server may generate a message. The message includes a terminal identifier field, a system identifier field, an instruction type field, a control object field, a control status field, and the like.

The management server may add the terminal identifier to the terminal identifier field in the message, add the system identifier of the target operating system to the system identifier field in the message, and add an instruction type of the control instruction to the instruction type field in the message. The control instruction includes three types of instructions: an instruction for updating a working state of a hardware device in the terminal, an instruction for updating a system policy of the target operating system, and an instruction for updating data in the target operating system. The management server may add an object to which the control instruction is applied to the control object field in the message, and add a target state that the object needs to reach to the control status field in the message. Then, the management server sends the message to the proxy server.

Step S202: The proxy server receives the control information and the terminal identifier, where the control information and the terminal identifier are sent by the management server.

Step S203: The proxy server sends the control information to the terminal based on the terminal identifier.

In this embodiment of the present disclosure, a communication connection between the proxy server and the terminal is sometimes abnormal. For example, the communication connection is temporarily disconnected or the terminal temporarily has no permission to use the communication connection. When the communication connection between the proxy server and the terminal is abnormal, the proxy server cannot send the control information to the terminal.

Therefore, when the proxy server receives the control information and the terminal identifier, where the control information and the terminal identifier are sent by the management server, the proxy server needs to detect whether the communication connection between the proxy server and the terminal is abnormal. If the communication connection is normal, the proxy server may send the control information to the terminal based on the terminal identifier at this time. If the communication connection is abnormal, the proxy server cannot send the control information to the terminal based on the terminal identifier at this time. However, although the proxy server cannot send the control information to the terminal based on the terminal identifier at this time, in order that the proxy server can send the control information to the terminal based on the terminal identifier after the communication connection is normal, the proxy server may locally store a correspondence between the control information and the terminal identifier. Then, when the proxy server detects that the communication connection between the proxy server and the terminal is normal, the proxy server obtains the control information and the terminal identifier from the correspondence, and sends the control information to the terminal based on the terminal identifier. In this way, reliability of sending the control information to the terminal is improved.

Further, after the proxy server sends the control information to the terminal based on the terminal identifier, to save local storage space of the proxy server, the proxy server may locally delete the correspondence between the control information and the terminal identifier.

In this embodiment of the present disclosure, the proxy server may exchange data with the terminal over TCP/IP. Therefore, in this step, the proxy server may send the control information to the terminal over the TCP/IP. Specifically, after connecting to a network, the terminal initiates a TCP long connection request to the proxy server based on a pre-stored IP address and port of the proxy server. After receiving the TCP long connection request, the proxy server establishes a TCP connection to the terminal and sends the control information to the terminal by using the established TCP connection.

In this embodiment of the present disclosure, the management server does not need to establish a communication connection to each terminal, but only needs to establish a communication connection to the proxy server. This reduces a quantity of communication connections that need to be established by the management server and saves communication resources of the management server.

In addition, if there is no proxy server, the management server needs to establish a communication connection to each terminal. When needing to send control information to a terminal, the management server needs to detect whether a communication connection between the management server and the terminal is normal. The management server can send the control information to the terminal only when the communication connection between the management server and the terminal is normal. When needing to separately send control information to a plurality of terminals, the management server needs to detect whether a communication connection between the management server and each of the plurality of terminals is normal. This increases system load of the management server. In this embodiment of the present disclosure, the management server does not need to establish a communication connection to each terminal, but only needs to establish a communication connection to the proxy server. The proxy server establishes a communication connection to each terminal. Therefore, when needing to separately send control information to a plurality of terminals, the management server only needs to learn whether the communication connection between the management server and the proxy server is normal, and does not need to learn whether the communication connection between the proxy server and each of the plurality of terminals is abnormal and does not need to detect whether the communication connection between the proxy server and each of the plurality of terminals is normal. This avoids increasing the system load of the management server.

In addition, in this embodiment of the present disclosure, communication protocols supported by the terminals may be different. Therefore, if there is no proxy server, the management server needs to support the communication protocols supported by all the terminals. In this way, the management server can communicate with each terminal. This increases system complexity of the management server. In this embodiment of the present disclosure, the management server only needs to communicate with the proxy server and does not need to communicate with each terminal. The management server only needs to support a communication protocol supported by the proxy server and does not need to support the communication protocols supported by all the terminals. This decreases the system complexity of the management server.

In this embodiment of the present disclosure, when the plurality of terminals need to be separately controlled, the control information does not need to be sent to each terminal, and the control information only needs to be sent to the proxy server. This implements unified control.

Step S204: The terminal receives the control information sent by the proxy server.

After the terminal receives the control information sent by the proxy server, for a process in which the terminal controls the terminal according to the control information, refer to the embodiment shown in FIG. 2. Details are not described herein.

Figure 5:
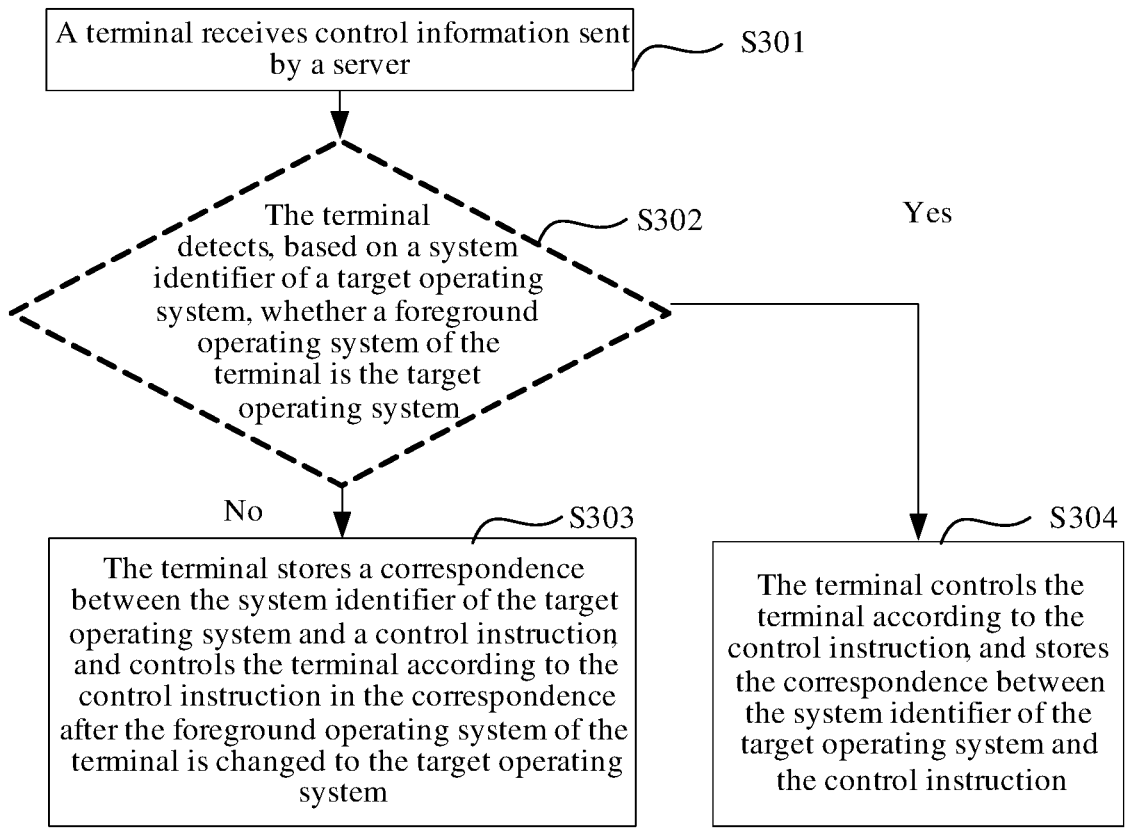
FIG. 5 is a flowchart of a terminal control method according to an example embodiment.

FIG. 5 is a flowchart of a terminal control method according to an example embodiment. As shown in FIG. 5, the method is applied to the terminal shown in FIG. 1 or FIG. 3. The method includes the following steps.

Step S301: The terminal receives control information sent by a server, where the control information carries a control instruction and a system identifier of a target operating system, the control instruction instructs to perform an indicated operation on the terminal, the target operating system is one of at least two operating systems on the terminal, and the control information instructs to control the terminal according to the control instruction when a foreground operating system of the terminal is the target operating system.

Step S302: The terminal detects, based on the system identifier of the target operating system, whether the foreground operating system of the terminal is the target operating system.

Step S303: If the terminal determines that the foreground operating system of the terminal is not the target operating system, the terminal stores a correspondence between the system identifier of the target operating system and the control instruction, and controls the terminal according to the control instruction in the correspondence after the foreground operating system of the terminal is changed to the target operating system.

Step S304: If the terminal determines that the foreground operating system of the terminal is the target operating system, the terminal controls the terminal according to the control instruction, and stores the correspondence between the system identifier of the target operating system and the control instruction.

For detailed explanations of step S301 to step S304 in this embodiment of the present disclosure, refer to the embodiment shown in FIG. 2. Details are not described herein.

In this embodiment of the present disclosure, any terminal communicatively connected to the management server may simultaneously receive a plurality of pieces of control information separately sent by the management server. A control instruction carried in each piece of control information is used to control the terminal when the foreground operating system of the terminal is a different operating system. In other words, the terminal may simultaneously receive at least two control instructions, and each of the at least two control instructions is a control instruction used to control the terminal when the foreground operating system of the terminal is a different operating system. However, when the terminal receives the at least two control instructions, only one of the at least two operating systems of the terminal is the foreground operating system of the terminal, and other operating systems are background operating systems of the terminal.

Therefore, it is assumed that a control instruction carried in any piece of control information that is sent by the management server and received by the terminal is a control instruction used to control the terminal when the foreground operating system of the terminal is the target operating system, and the target operating system is one of the at least two operating systems on the terminal. When the foreground operating system of the terminal is not the target operating system, the terminal does not control the terminal according to the control instruction. Then, the terminal may store the correspondence between the system identifier of the target operating system and the control instruction, so that after the foreground operating system of the terminal is changed to the target operating system, the terminal may further obtain the control instruction according to the correspondence, and control the terminal according to the control instruction. In this way, management personnel can control the terminal when the foreground operating system of the terminal is the target operating system, and perform accurate differentiated management and control on the terminal in a plurality of different operating systems.

Because the at least two operating systems are installed on the terminal, when a terminal user uses the terminal, the user may change the foreground operating system of the terminal. For example, the terminal user changes the foreground operating system of the terminal from a personal operating system to an office operating system, or changes the foreground operating system of the terminal from the office operating system to the personal operating system.

In this embodiment of the present disclosure, when the foreground operating system of the terminal is different, the management personnel control the terminal in a different control manner, in other words, different foreground operating systems correspond to different control instructions. Therefore, if the foreground operating system of the terminal is changed, a control manner for controlling the terminal needs to be changed, in other words, a control instruction needs to be changed to control the terminal.

Figure 6:
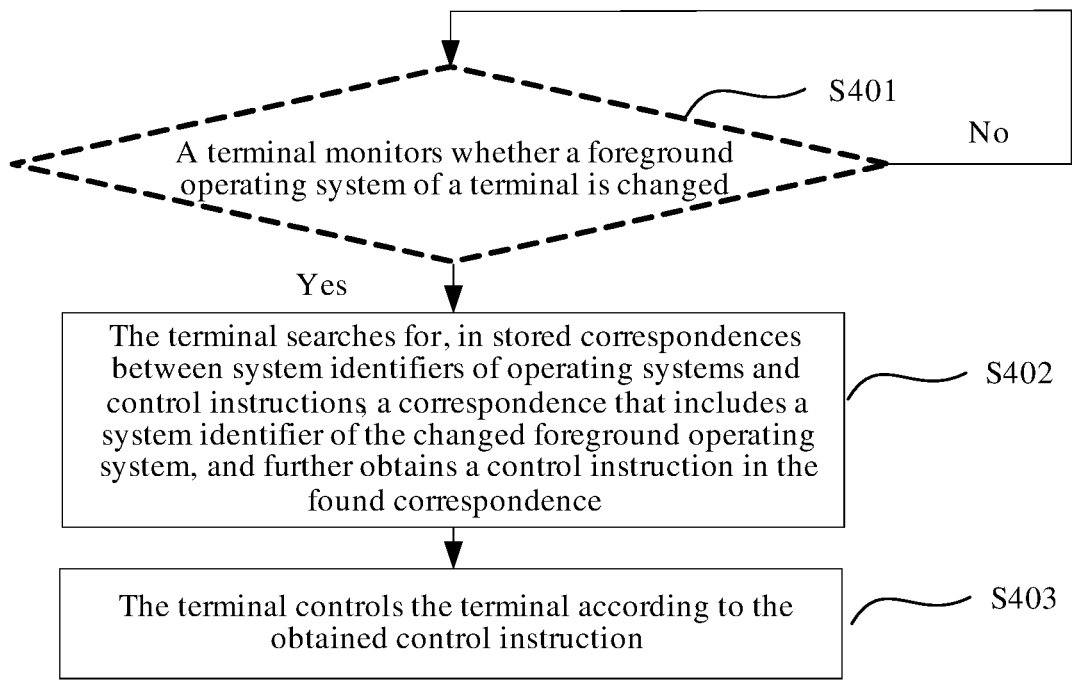
FIG. 6 is a flowchart of a terminal control method according to an example embodiment.

In order that the terminal can control the terminal in time according to a control instruction corresponding to a system identifier of the changed foreground operating system when the foreground operating system of the terminal is changed, referring to FIG. 6, on a basis of the method shown in FIG. 5, the method further includes the following process:

Step S401: The terminal monitors whether the foreground operating system of the terminal is changed.

When the foreground operating system of the terminal is changed, in step S402, the terminal searches for, in stored correspondences between system identifiers of the operating systems and control instructions, a correspondence that includes a system identifier of the changed foreground operating system, and further obtains a control instruction in the found correspondence.

When the foreground operating system of the terminal is not changed, the terminal returns to step S401.

Step S403: The terminal controls the terminal according to the obtained control instruction.

For detailed explanations of step S401 to step S403 in this embodiment of the present disclosure, refer to the embodiment shown in FIG. 2. Details are not described herein.

Further, in another embodiment of the present disclosure, the management personnel may no longer need to enable the terminal to control the terminal according to the control instruction when the foreground operating system of the terminal is the target operating system.

If the management personnel no longer need to enable the terminal to control the terminal according to the control instruction when the foreground operating system of the terminal is the target operating system, the management personnel may enter, on the server, a terminal identifier of the terminal and a stop control information, add the control instruction and the system identifier of the target operating system to the stop control information, and submit the terminal identifier and the stop control information to the server. The stop control information instructs to stop controlling the terminal according to the control instruction when the foreground operating system of the terminal is the target operating system. The server sends the stop control information to the terminal based on the terminal identifier. When the terminal receives the stop control information sent by the server, the terminal extracts the system identifier of the target operating system and the control instruction from the stop control information, and searches for the correspondence between the system identifier of the target operating system and the control instruction from the plurality of previously stored correspondences, and deletes the correspondence.

In this way, when the foreground operating system of the terminal is changed to the target operating system, the terminal cannot obtain the control instruction corresponding to the target operating system. Therefore, the terminal does not control the terminal according to the control instruction.

Figure 7:
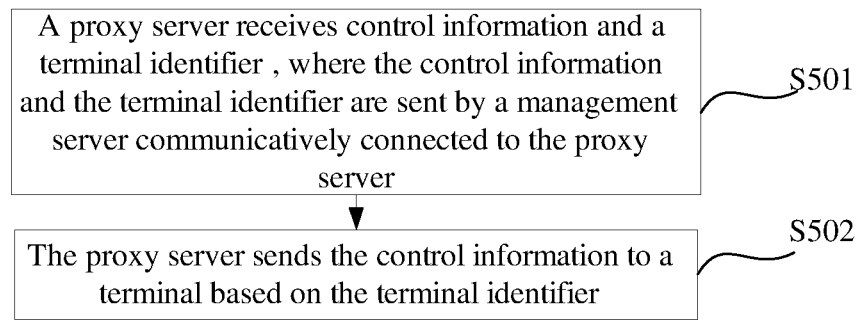
FIG. 7 is a flowchart of a terminal control method according to an example embodiment.

FIG. 7 is a flowchart of a terminal control method according to an example embodiment. As shown in FIG. 7, the method is applied to the proxy server shown in FIG. 3. The method includes the following steps.

Step S501: The proxy server receives control information and a terminal identifier, where the control information and the terminal identifier are sent by a management server communicatively connected to the proxy server, the control information carries a control instruction and a system identifier of a target operating system, the control instruction instructs to perform an indicated operation on a terminal, the target operating system is one of at least two operating systems on the terminal, and the control information instructs to control the terminal according to the control instruction when a foreground operating system of the terminal is the target operating system.

Step S502: The proxy server sends the control information to the terminal based on the terminal identifier.

For detailed explanations of step S501 to step S502 in this embodiment of the present disclosure, refer to the embodiment shown in FIG. 4A and FIG. 4B. Details are not described herein.

In this embodiment of the present disclosure, the management server does not need to establish a communication connection to each terminal, but only needs to establish a communication connection to the proxy server. This reduces a quantity of communication connections that need to be established by the management server and saves communication resources of the management server.

In addition, if there is no proxy server, the management server needs to establish a communication connection to each terminal. When needing to send control information to a terminal, the management server needs to detect whether a communication connection between the management server and the terminal is normal. The management server can send the control information to the terminal only when the communication connection between the management server and the terminal is normal. When needing to separately send control information to a plurality of terminals, the management server needs to detect whether a communication connection between the management server and each of the plurality of terminals is normal. This increases system load of the management server. In this embodiment of the present disclosure, the management server does not need to establish a communication connection to each terminal, but only needs to establish a communication connection to the proxy server. The proxy server establishes a communication connection to each terminal. Therefore, when needing to separately send control information to a plurality of terminals, the management server only needs to learn whether the communication connection between the management server and the proxy server is normal, and does not need to learn whether the communication connection between the proxy server and each of the plurality of terminals is abnormal and does not need to detect whether the communication connection between the proxy server and each of the plurality of terminals is normal. This avoids increasing the system load of the management server.

In addition, in this embodiment of the present disclosure, communication protocols supported by the terminals may be different. Therefore, if there is no proxy server, the management server needs to support the communication protocols supported by all the terminals. In this way, the management server can communicate with each terminal. This increases system complexity of the management server. In this embodiment of the present disclosure, the management server only needs to communicate with the proxy server and does not need to communicate with each terminal. The management server only needs to support a communication protocol supported by the proxy server and does not need to support the communication protocols supported by all the terminals. This decreases the system complexity of the management server.

In this embodiment of the present disclosure, when the plurality of terminals need to be separately controlled, the control information does not need to be sent to each terminal, and the control information only needs to be sent to the proxy server. This implements unified control.

In still another embodiment of the present disclosure, an information format of the control information sent by the management server to the proxy server may be inconsistent with an information format supported by the terminal. When the information format of the control information sent by the management server to the proxy server is inconsistent with the format of the information supported by the terminal, the terminal cannot locally identify the control information, to be specific, cannot identify the control instruction and the system identifier in the control information. Further, the terminal cannot execute the control instruction and cannot control the terminal according to the control instruction when the foreground operating system of the terminal is the target operating system. Therefore, when receiving the control information sent by the management server, the proxy server needs to detect whether the information format of the control information is the information format supported by the terminal. When the information format of the control information is not the information format supported by the terminal, the proxy server converts the information format of the control information to the information format supported by the terminal.

Then, the proxy server sends, based on the terminal identifier, the control information whose information format is converted to the terminal. The terminal may locally execute the control instruction in the control information whose information format is converted, to control the terminal according to the control instruction when the foreground operating system of the terminal is the target operating system.

The information format of the control information includes: a keyword used to indicate a system identifier, a keyword used to indicate an instruction type of a control instruction, a keyword used to indicate a target control state of the control instruction, and the like.

Technical personnel may store an information format of control information supported by each terminal on the proxy server in advance. Therefore, the proxy server may locally obtain, based on the terminal identifier, the information format supported by the terminal.

For example, when the management personnel need to prohibit a terminal user from using a Wi-Fi device in the terminal when the foreground operating system of the terminal is a personal operating system.

It is assumed that the control information entered by the management personnel on the management server may be: "operating system ID=personal, wifidevice=disable", where the "operating system ID" is a keyword used to indicate a system identifier, "personal" is the system identifier, and "wifidevice" is a keyword used to indicate an instruction type of a control instruction. In this example, the control instruction is used to control the Wi-Fi device, "disable" is a keyword used to indicate a target control state of the control instruction. In this example, the target control state of the Wi-Fi device in the terminal needs to be controlled to be disabled. In addition, the keyword used to indicate the target control state of the control instruction is "enable", namely, in this example, the keyword used to indicate the target control state of the control instruction is "enable" or "disable".

It is assumed that the information format of the control information supported by the terminal is "OS ID=( ) wifidevice=( )", where in the information format, "OS ID" is the keyword used to indicate a system identifier, and "wifidevice" is the keyword used to indicate an instruction type of the control instruction, the first parenthesis "( )" is used to fill in the system identifier, and the second parenthesis "( )" is used to fill in the keyword of the target control state of the control instruction. In this example, the keyword used to indicate the target control state of the control instruction is "1" or "0", the keyword "1" is equivalent to the keyword "enable", and the keyword "0" is equivalent to the keyword "disable".

When the terminal receives the control information "operating system ID=personal, wifidevice=disable", the terminal cannot find the keyword "OS ID" used to indicate the system identifier. Although the terminal can find the keyword "wifidevice" used to indicate the instruction type of the control instruction, the terminal cannot find the keyword "0" or "1" that is used to indicate the target control state of the control instruction. Therefore, the terminal cannot power off the Wi-Fi device in the terminal when the foreground operating system of the terminal is the personal operating system, and the management personnel cannot prohibit the terminal user from using the Wi-Fi device in the terminal when the foreground operating system of the terminal is the personal operating system.

The technical personnel may store a format conversion relationship table corresponding to the terminal on the proxy server in advance. Table 1 shows the format conversion relationship table corresponding to the terminal.

TABLE 1

| operating system ID | OS ID |
|---|---|
| enable | 0 |
| disable | 1 |

Therefore, when receiving the control information "operating system ID=personal, wifidevice=disable", the proxy server may search the format conversion relationship table corresponding to the terminal for the keyword "OS ID" corresponding to the keyword "operating system ID" used to indicate the system identifier, search for the keyword "0" corresponding to the target control state "disable", modify "operating system ID" in the control information "operating system ID=personal, wifidevice=disable" to "OS ID", and modify "disable" to 0, to obtain the control information "OS ID=personal, wifidevice=0". In this way, the terminal may find, in the control information "OS ID=personal, wifidevice=0", the keyword "OS ID" used to indicate the system identifier, find the system identifier "personal", and find the keyword "wifidevice" used to indicate the instruction type of the control instruction, and find the keyword "0" used to indicate the target control state of the control instruction. Therefore, the terminal can power off the Wi-Fi device in the terminal when the foreground operating system of the terminal is the personal operating system, and the management personnel can prohibit the terminal user from using the Wi-Fi device in the terminal when the foreground operating system of the terminal is the personal operating system.

If there is no proxy server, the management server sends control information to any terminal. An information format of the sent control information is an information format supported by the terminal. When different terminals support different information formats of control information, the management server needs to support many information formats. This increases system complexity of the management server.

In this embodiment of the present disclosure, the proxy server may convert the information format of the control information sent by the management server into the information format supported by each terminal. Therefore, the management server does not need to support the information format supported by each terminal, and system complexity of the management server is decreased.

Figure 8:
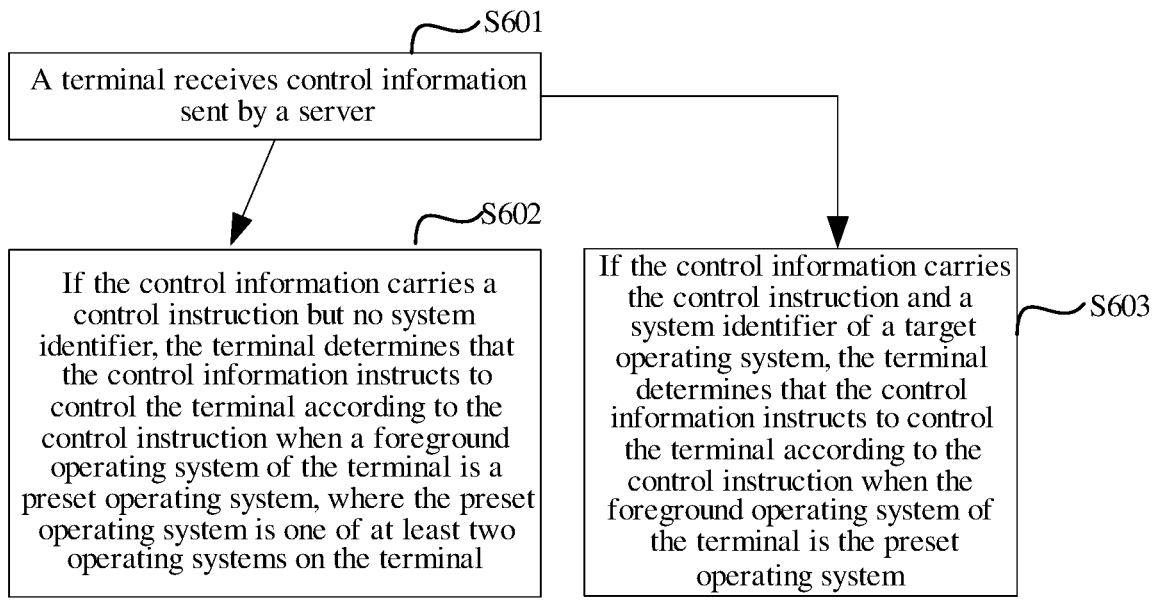
FIG. 8 is a flowchart of a terminal control method according to an example embodiment.

FIG. 8 is a flowchart of a terminal control method according to an example embodiment. As shown in FIG. 8, the method is applied to the terminal shown in FIG. 1 or FIG. 3. The method includes the following steps.

Step S601: The terminal receives control information sent by a proxy server.

If the control information carries a control instruction but no system identifier, in step S602, the terminal determines that the control information instructs to control the terminal according to the control instruction when a foreground operating system of the terminal is a preset operating system, where the preset operating system is one of at least two operating systems on the terminal.

In this embodiment of the present disclosure, when entering the control information on the server, management personnel need to add the control instruction to the control information, but may not add the system identifier to a system identifier field in the control information. In this way, the terminal determines that the control information instructs to control the terminal according to the control instruction when the foreground operating system of the terminal is the preset operating system. When the foreground operating system of the terminal is not the preset operating system, the terminal stores a correspondence between a system identifier of the preset operating system and the control instruction, so that when the foreground operating system of the terminal is the preset operating system, the terminal obtains the control instruction from the correspondence, and controls the terminal according to the control instruction; and when the foreground operating system of the terminal is the preset operating system, the terminal controls the terminal according to the control instruction.

If the control information carries the control instruction and a system identifier of a target operating system, in step S603, the terminal determines that the control information instructs to control the terminal according to the control instruction when the foreground operating system of the terminal is the target operating system.

In this embodiment of the present disclosure, the control information includes the system identifier field. When entering the control information on the server, the management personnel need to add the control instruction to the control information, and may add the system identifier of the target operating system to the system identifier field in the control information. In this way, the terminal determines the control instruction as the control instruction used to control the terminal when the foreground operating system of the terminal is the target operating system. When the foreground operating system of the terminal is not the target operating system, the terminal stores a correspondence between the system identifier of the target operating system and the control instruction, so that when the foreground operating system of the terminal is the target operating system, the terminal obtains the control instruction from the correspondence, and controls the terminal according to the control instruction; and when the foreground operating system of the terminal is the target operating system, the terminal controls the terminal according to the control instruction.

If there is only one operating system on the terminal, when entering control information on the server, the management personnel only need to add a control instruction to the control information, and do not need to add a system identifier of the operating system on the terminal to the control information.

There is only one operating system on the terminal and the operating system is always the foreground operating system of the terminal. Therefore, when the terminal receives the control information, the terminal controls the terminal according to the control instruction carried in the control information.

However, when there are a plurality of operating systems on the terminal, a system identifier usually needs to be added to control information, so that the terminal can control the terminal according to a control instruction carried in the control information when the terminal determines that the foreground operating system is an operating system corresponding to the system identifier. Otherwise, the terminal cannot determine, when the foreground operating system of the terminal is which operating system, to control the terminal according to the control instruction carried in the control information. Therefore, the terminal does not perform an operation of controlling the terminal according to the control instruction. In other words, when there are a plurality of operating systems on the terminal, it is usually not supported that the control information carries only a control instruction but no system identifier.

However, in this embodiment of the present disclosure, when there are a plurality of operating systems on the terminal, it is supported that the control information carries only a control instruction but no system identifier. When the control information carries the control instruction but no system identifier, the terminal may determine the control instruction as a control instruction used to control the terminal when the foreground operating system of the terminal is a preset operating system. The preset operating system is one of the at least two operating systems on the terminal. It is also supported that the control information carries both the control instruction and the system identifier. In this way, the terminal determines the control instruction as the control instruction used to control the terminal when the foreground operating system of the terminal is the operating system corresponding to the system identifier.

Figure 9:
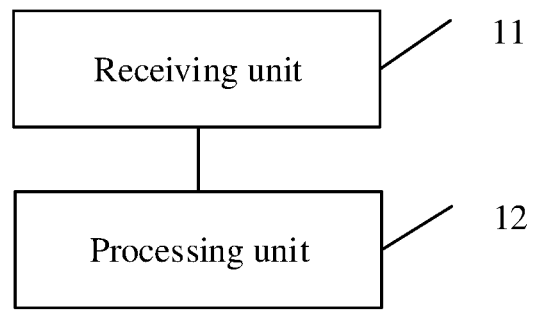
FIG. 9 is a schematic diagram of a structure of a terminal according to an example embodiment.

FIG. 9 is a schematic diagram of a structure of a terminal according to an example embodiment. Referring to FIG. 9, the terminal includes a receiving unit 11 and a processing unit 12.

The receiving unit 11 is configured to receive first control information sent by a server. The first control information carries a first control instruction and a system identifier of a first operating system. The first control instruction instructs to perform an indicated operation on the terminal. The first operating system is one of at least two operating systems on the terminal. The first control information instructs to control the terminal according to the first control instruction when a foreground operating system of the terminal is the first operating system.

The processing unit 12 is configured to determine, based on the system identifier of the first operating system, that the foreground operating system of the terminal is not the first operating system, and store a correspondence between the system identifier of the first operating system and the first control instruction; and after the foreground operating system of the terminal is changed to the first operating system, control the terminal according to the first control instruction in the correspondence.

In this embodiment of the present disclosure, any terminal communicatively connected to a management server may simultaneously receive a plurality of pieces of control information separately sent by the management server. A control instruction carried in each piece of control information is used to control the terminal when the foreground operating system of the terminal is a different operating system. In other words, the terminal may simultaneously receive at least two control instructions, and each of the at least two control instructions is a control instruction used to control the terminal when the foreground operating system of the terminal is a different operating system. However, when the terminal receives the at least two control instructions, only one of the at least two operating systems of the terminal is the foreground operating system of the terminal, and other operating systems are background operating systems of the terminal.

Therefore, it is assumed that a control instruction carried in any piece of control information that is sent by the management server and received by the terminal is a control instruction used to control the terminal when the foreground operating system of the terminal is a target operating system, and the target operating system is one of the at least two operating systems on the terminal. When the foreground operating system of the terminal is not the target operating system, the terminal does not control the terminal according to the control instruction. Then, the terminal may store a correspondence between a system identifier of the target operating system and the control instruction, so that after the foreground operating system of the terminal is changed to the target operating system, the terminal may further obtain the control instruction according to the correspondence, and control the terminal according to the control instruction. In this way, management personnel can control the terminal when the foreground operating system of the terminal is the target operating system, and perform accurate differentiated management and control on the terminal in a plurality of different operating systems.

Further, the receiving unit 11 is configured to receive second control information sent by the server. The second control information carries a second control instruction and a system identifier of a second operating system. The second control instruction instructs to perform an indicated operation on the terminal. The second operating system is one of the at least two operating systems on the terminal. The second control information instructs to control the terminal according to the second control instruction when the foreground operating system of the terminal is the second operating system.

The processing unit 12 is configured to determine, based on the system identifier of the second operating system, that the foreground operating system of the terminal is the second operating system, and control the terminal according to the second control instruction.

Because there are at least two operating systems on the terminal, when a terminal user uses the terminal, the user may change the foreground operating system of the terminal. For example, the terminal user changes the foreground operating system of the terminal from a personal operating system to an office operating system, or changes the foreground operating system of the terminal from an office operating system to a personal operating system.

In this embodiment of the present disclosure, when the foreground operating system of the terminal is different, the management personnel control the terminal in a different control manner, in other words, different foreground operating systems correspond to different control instructions. Therefore, if the foreground operating system of the terminal is changed, a control manner for controlling the terminal needs to be changed, in other words, a control instruction needs to be changed to control the terminal.

In order that the terminal can control the terminal in time according to a control instruction corresponding to a system identifier of the changed foreground operating system when the foreground operating system of the terminal is changed, the processing unit 12 is further configured to store a correspondence between the system identifier of the second operating system and the second control instruction; determine that the foreground operating system of the terminal is changed, and if the changed foreground operating system is the second operating system, obtain the second control instruction from the correspondence between the system identifier of the second operating system and the second control instruction; and control the terminal according to the second control instruction.

Further, the receiving unit 11 is configured to receive third control information sent by the server. The third control information carries a third control instruction but no system identifier. The third control instruction instructs to perform an indicated operation on the terminal. The third control information instructs to control the terminal according to the third control instruction when the foreground operating system of the terminal is a preset operating system. The preset operating system is one of the at least two operating systems of the terminal.

The processing unit 12 is further configured to determine that the foreground operating system of the terminal is the preset operating system, and control the terminal according to the third control instruction.

If there is only one operating system on the terminal, when entering control information on the server, the management personnel only need to add a control instruction to the control information, and do not need to add a system identifier of the operating system on the terminal to the control information.

There is only one operating system on the terminal and the operating system is always the foreground operating system of the terminal. Therefore, when the terminal receives the control information, the terminal controls the terminal according to the control instruction carried in the control information.

However, when there are a plurality of operating systems on the terminal, a system identifier usually needs to be added to control information, so that the terminal can control the terminal according to a control instruction carried in the control information when the terminal determines that the foreground operating system is an operating system corresponding to the system identifier. Otherwise, the terminal cannot determine, when the foreground operating system of the terminal is which operating system, to control the terminal according to the control instruction carried in the control information. Therefore, the terminal does not perform an operation of controlling the terminal according to the control instruction. In other words, when there are a plurality of operating systems on the terminal, it is usually not supported that the control information carries only a control instruction but no system identifier.

However, in this embodiment of the present disclosure, when there are a plurality of operating systems on the terminal, it is supported that the control information carries only a control instruction but no system identifier. When the control information carries the control instruction but no system identifier, the terminal may determine the control instruction as a control instruction used to control the terminal when the foreground operating system of the terminal is a preset operating system. The preset operating system is one of the at least two operating systems on the terminal. It is also supported that the control information carries both the control instruction and the system identifier. In this way, the terminal determines the control instruction as the control instruction used to control the terminal when the foreground operating system of the terminal is the operating system corresponding to the system identifier.

Further, the receiving unit 11 is configured to detect whether a communication connection between the terminal and the server is normal; if the communication connection between the terminal and the server is normal, send, to the server, an obtaining request used for obtaining the first control information; and receive the first control information returned by the server according to the obtaining request.

In another embodiment of the present disclosure, the communication connection between the management server and the terminal is sometimes abnormal, and the management server cannot send the control information to the terminal when the communication connection is abnormal. In other words, the terminal cannot receive the control information. Therefore, to obtain the control information from the management server as quickly as possible and achieve a purpose of the management personnel, the terminal may detect whether the communication connection between the terminal and the management server is normal. When the communication connection between the terminal and the management server is normal, the terminal may send an obtaining request used to obtain the control information to the management server. The obtaining request further carries a terminal identifier of the terminal. When the management server receives the obtaining request, the management server may extract the terminal identifier from the obtaining request, obtain, based on the terminal identifier, a correspondence between the control information and the terminal identifier from a locally stored correspondence, obtain the control information from the correspondence, and send the control information to the terminal based on the terminal identifier. The terminal receives the control information returned by the management server according to the obtaining request.

Further, the receiving unit 11 is configured to receive stop control information sent by the server. The stop control information carries the first control instruction and the system identifier of the first operating system. The stop control information instructs to stop controlling the terminal according to the first control instruction when the foreground operating system of the terminal is the first operating system.

The processing unit 12 is further configured to delete, based on the stop control information received by the receiving unit, the correspondence, between the system identifier of the first operating system and the first control instruction, that is stored on the terminal.

In another embodiment of the present disclosure, the management personnel may no longer need to enable the terminal to control the terminal according to the control instruction when the foreground operating system of the terminal is the target operating system. In this case, the management personnel may enter, on the management server, the terminal identifier of the terminal and the stop control information including the control instruction and the system identifier of the target operating system, and then submit the terminal identifier and the stop control information to the management server. The stop control information instructs to stop controlling the terminal according to the control instruction when the foreground operating system of the terminal is the target operating system. The management server sends the stop control information to the terminal based on the terminal identifier.

The second operating system is a personal operating system, and the second control instruction instructs to prohibit using a Wi-Fi device in the terminal.

The processing unit 12 is further configured to power off the Wi-Fi device by using driver information of the Wi-Fi device in the terminal.

The second operating system is an office operating system, the second control instruction is used to indicate that a Wi-Fi device in the terminal is allowed to be used, and only a preset access point can be connected when the Wi-Fi device of the terminal is used.

The processing unit 12 is further configured to power on the Wi-Fi device by using driver information of the Wi-Fi device in the terminal, and set a Wi-Fi access point identifier list of the office operating system by using an API in a system service of a container, where the container bears the office operating system, and the Wi-Fi access point identifier list includes only an identifier of the preset access point.

Figure 10:
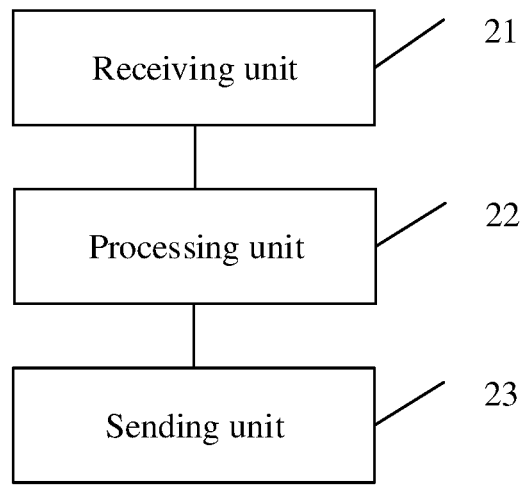
FIG. 10 is a schematic diagram of a structure of a proxy server according to an example embodiment.

FIG. 10 is a schematic diagram of a structure of a proxy server according to an example embodiment. Referring to FIG. 10, the proxy server includes a receiving unit 21, a processing unit 22, and a sending unit 23.

The receiving unit 21 is configured to receive control information and a terminal identifier, where the control information and the terminal identifier are sent by a management server communicatively connected to the proxy server. The control information carries a control instruction and a system identifier of an operating system. The control instruction instructs to perform an indicated operation on a terminal corresponding to the terminal identifier. The operating system is one of at least two operating systems on the terminal. The control information instructs to control the terminal according to the control instruction when a foreground operating system of the terminal is the operating system.

The processing unit 22 is configured to determine that a communication connection between the proxy server and the terminal is abnormal, and store a correspondence between the control information and the terminal identifier.

The sending unit 23 is configured to send, after the communication connection between the proxy server and the terminal is normal, the control information to the terminal based on the terminal identifier.

In this embodiment of the present disclosure, the management server does not need to establish a communication connection to each terminal, but only needs to establish a communication connection to the proxy server. This reduces a quantity of communication connections that need to be established by the management server and saves communication resources of the management server.

In addition, if there is no proxy server, the management server needs to establish a communication connection to each terminal. When needing to send the control information to a terminal, the management server needs to detect whether a communication connection between the management server and the terminal is normal. The management server can send the control information to the terminal only when the communication connection between the management server and the terminal is normal. When needing to separately send the control information to a plurality of terminals, the management server needs to detect whether a communication connection between the management server and each of the plurality of terminals is normal. This increases system load of the management server. In this embodiment of the present disclosure, the management server does not need to establish a communication connection to each terminal, but only needs to establish a communication connection to the proxy server. The proxy server establishes a communication connection to each terminal. Therefore, when needing to separately send control information to a plurality of terminals, the management server only needs to learn whether the communication connection between the management server and the proxy server is normal, and does not need to learn whether the communication connection between the proxy server and each of the plurality of terminals is abnormal and does not need to detect whether the communication connection between the proxy server and each of the plurality of terminals is normal. This avoids increasing the system load of the management server.

In addition, in this embodiment of the present disclosure, communication protocols supported by the terminals may be different. Therefore, if there is no proxy server, the management server needs to support the communication protocols supported by all the terminals. In this way, the management server can communicate with each terminal. This increases system complexity of the management server. In this embodiment of the present disclosure, the management server only needs to communicate with the proxy server and does not need to communicate with each terminal. The management server only needs to support a communication protocol supported by the proxy server and does not need to support the communication protocols supported by all the terminals. This decreases the system complexity of the management server.

In this embodiment of the present disclosure, when the plurality of terminals need to be separately controlled, the control information does not need to be sent to each terminal, and the control information only needs to be sent to the proxy server. This implements unified control.

In this embodiment of the present disclosure, the communication connection between the proxy server and the terminal is sometimes abnormal. For example, the communication connection is temporarily disconnected or the terminal temporarily has no permission to use the communication connection. When the communication connection between the proxy server and the terminal is abnormal, the proxy server cannot send the control information to the terminal.

Therefore, when the proxy server receives the control information and the terminal identifier, where the control information and the terminal identifier are sent by the management server, the proxy server needs to detect whether the communication connection between the proxy server and the terminal is abnormal. If the communication connection is normal, the proxy server may send the control information to the terminal based on the terminal identifier at this time. If the communication connection is abnormal, the proxy server cannot send the control information to the terminal based on the terminal identifier at this time. However, although the proxy server cannot send the control information to the terminal based on the terminal identifier at this time, in order that the proxy server can send the control information to the terminal based on the terminal identifier after the communication connection is normal, the proxy server may locally store the correspondence between the control information and the terminal identifier. Then, when the proxy server detects that the communication connection between the proxy server and the terminal is normal, the proxy server obtains the control information and the terminal identifier from the correspondence, and sends the control information to the terminal based on the terminal identifier. In this way, reliability of sending the control information to the terminal is improved.

Further, the receiving unit 21 is configured to receive stop control information and the terminal identifier of the terminal, where the stop control information and the terminal identifier of the terminal are sent by the management server. The stop control information carries the control instruction and the system identifier of the operating system. The stop control information instructs to stop controlling the terminal according to the control instruction when the foreground operating system of the terminal is the operating system.

The sending unit 23 is further configured to send the stop control information to the terminal based on the terminal identifier, so that the terminal deletes a correspondence, between the system identifier of the operating system and the control instruction, that is stored on the terminal.

Further, in this embodiment of the present disclosure, management personnel may no longer need to enable the terminal to control the terminal according to the control instruction when the foreground operating system of the terminal is a target operating system.

If the management personnel no longer needs to enable the terminal to control the terminal according to the control instruction when the foreground operating system of the terminal is the target operating system, the management personnel may enter, on the management server, the terminal identifier of the terminal and the stop control information, add the control instruction and a system identifier of the target operating system to the stop control information, and then submit the terminal identifier and the stop control information to the management server. The stop control information instructs to stop controlling the terminal according to the control instruction when the foreground operating system of the terminal is the target operating system. The management server sends the stop control information to the proxy server based on the terminal identifier. When receiving the terminal identifier and the stop control information, where the terminal identifier and the stop control information are sent by the management server, the proxy server sends the stop control information to the terminal based on the terminal identifier. When receiving the stop control information sent by the proxy server, the terminal extracts the system identifier of the target operating system and the control instruction from the stop control information, and locally searches for a correspondence between the system identifier of the target operating system and the control instruction, and deletes the correspondence.

In this way, when the foreground operating system of the terminal is changed to the target operating system, the terminal cannot obtain the control instruction corresponding to the system identifier of the target operating system. Therefore, the terminal does not control the terminal according to the control instruction.

Further, the sending unit 23 is configured to determine that an information format of the control information is not an information format supported by the terminal, convert the information format of the control information to the information format supported by the terminal, and send the control information in the information format supported by the terminal to the terminal based on the terminal identifier.

In the present disclosure, the information format of the control information sent by the management server to the proxy server may be inconsistent with the information format supported by the terminal. When the information format of the control information sent by the management server to the proxy server is inconsistent with the format of the information supported by the terminal, the terminal cannot locally identify the control information, to be specific, cannot identify the control instruction and the system identifier in the control information. Further, the terminal cannot execute the control instruction and cannot control the terminal according to the control instruction when the foreground operating system of the terminal is the target operating system. Therefore, when receiving the control information sent by the management server, the proxy server needs to detect whether the information format of the control information is the information format supported by the terminal. When the information format of the control information is not the information format supported by the terminal, the proxy server converts the information format of the control information to the information format supported by the terminal.

Then, the proxy server sends, based on the terminal identifier, the control information whose information format is converted to the terminal. The terminal may locally execute the control instruction in the control information whose information format is converted, to control the terminal according to the control instruction when the foreground operating system of the terminal is the target operating system.

Figure 11:
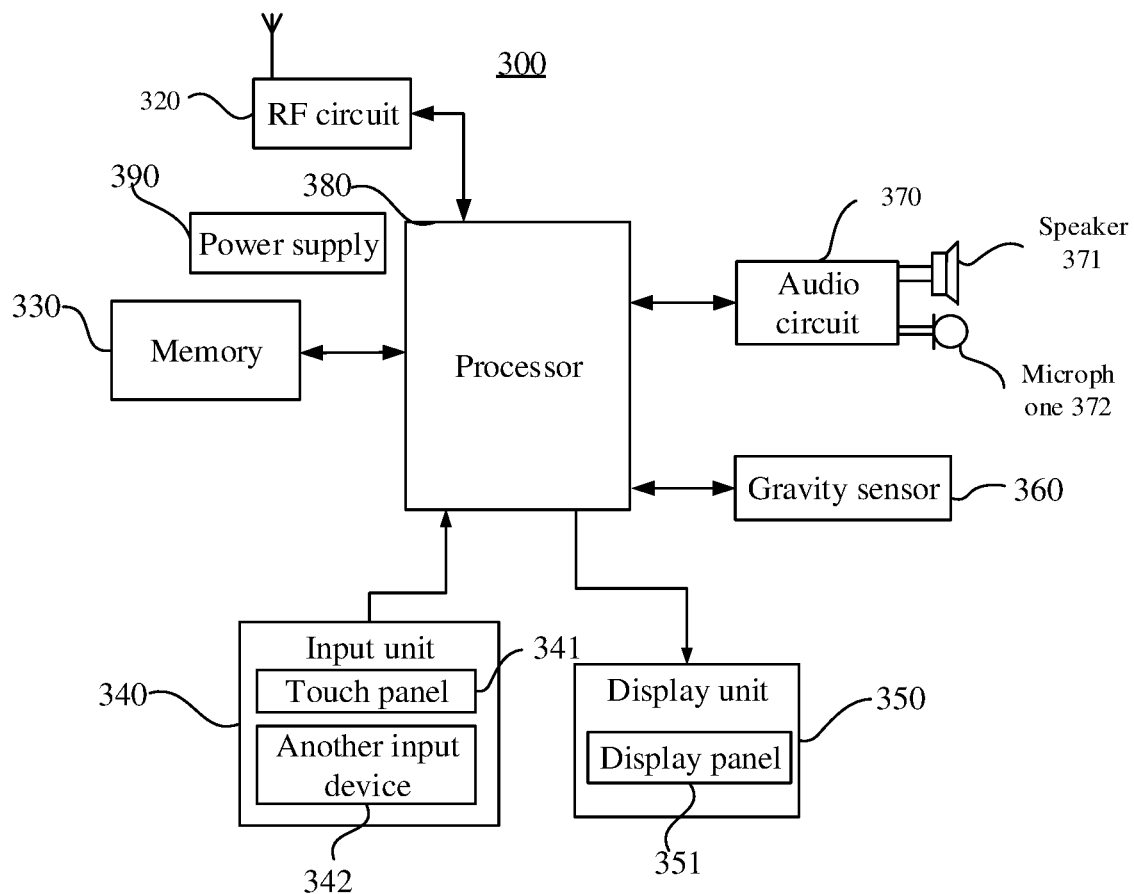
FIG. 11 is a schematic diagram of a structure of a terminal according to an example embodiment.

FIG. 11 is a schematic diagram of a structure of a terminal according to an example embodiment. The terminal provided in this embodiment of the present disclosure may be configured to implement the methods in the embodiments of the present disclosure shown in FIG. 5 to FIG. 6. For ease of description, only a part related to this embodiment of the present disclosure is shown. For specific technical details that are not disclosed, refer to the embodiments of the present disclosure shown in FIG. 5 to FIG. 6.

The terminal may be a terminal device such as a mobile phone, a tablet computer, a notebook computer, an ultra-mobile personal computer (UMPC), a netbook, or a personal digital assistant (PDA). In this embodiment of the present disclosure, an example in which the terminal is a mobile phone is used for description. FIG. 11 shows a block diagram of a partial structure of a mobile phone 300 related to the embodiments of the present disclosure.

As shown in FIG. 11, the mobile phone 300 includes a radio frequency (RF) circuit 320, a memory 330, an input unit 340, a display unit 350, a gravity sensor 360, an audio circuit 370, a processor 380, a power supply 390, and other components. A person skilled in the art may understand that the mobile phone structure shown in FIG. 11 does not constitute a limitation on the mobile phone. The terminal may include more or fewer components than those shown in the figure, or combine some components, or have different component arrangements.

The following describes the components of the mobile phone 300 in detail with reference to FIG. 11.

The RF circuit 320 may be configured to receive and send a signal in a process of sending and receiving information or in a call process, and send the received information to the processor 380 for processing. In addition, the RF circuit 320 sends uplink data to a proxy server or a management server. Usually, the RF circuit includes, but is not limited to, an antenna, at least one amplifier, a transceiver, a coupler, a low-noise amplifier (LNA), a duplexer, and the like. In addition, the RF circuit 320 may further communicate with a network and another device through wireless communication. Any communications standard or protocol may be used in the wireless communication, including but not limited to Global System for Mobile Communications (GSM), General Packet Radio Service (GPRS), code-division multiple access (CDMA), wideband code-division multiple access (WCDMA), Long-Term Evolution (LTE), email, a short message service (SMS), and the like.

The memory 330 may be configured to store a software program and a module. By running the software program and the module that are stored in the memory 330, the processor 380 executes various function applications of the mobile phone 300 and performs data processing. The memory 330 may mainly include a program storage area and a data storage area. The program storage area may store an operating system and an application program used by at least one function, such as a sound playing function or an image playing function. The data storage area may store data, such as audio data, image data, or an address book created according to use of the mobile phone 300. In addition, the memory 330 may include a high-speed random access memory, and may further include a nonvolatile memory, such as at least one magnetic disk storage, a flash memory, or another volatile solid-state storage.

The input unit 340 may be configured to: receive input digit or character information, and generate a key signal input related to a user setting and function control of the mobile phone 300. Specifically, the input unit 340 may include a touchscreen 341 and another input device 342. The touchscreen 341, which may also be referred to as a touch panel, may collect a touch operation of a user on or near the touchscreen, such as an operation of a user on or near the touchscreen 341 by using any suitable object or accessory such as a finger or a stylus, and drive a corresponding connection apparatus according to a preset program. Optionally, the touchscreen 341 may include two parts: a touch detection apparatus and a touch controller. The touch detection apparatus detects a touch direction of the user, detects a signal generated by a touch operation, and transmits the signal to the touch controller. The touch controller receives touch information from the touch detection apparatus, converts the touch information into contact coordinates, sends the contact coordinates to the processor 380, and receives and executes a command sent by the processor 380. In addition, the touchscreen 341 may be implemented by using a plurality of types such as a resistive type, a capacitive type, an infrared ray, and a surface acoustic wave. The input unit 340 may further include another input device 342 in addition to the touchscreen 341. Specifically, the another input device 342 may include, but not limited to, one or more of a physical keyboard, a function key, a trackball, a mouse, a joystick, and the like.

The display unit 350 may be configured to display information entered by the user or information provided for the user, and various menus of the mobile phone 300. The display unit 350 may include a display panel 351. Optionally, the display panel 351 may be configured in a form of a liquid crystal display (LCD), an organic light-emitting diode (OLED), or the like. Further, the touchscreen 341 may cover the display panel 351. After detecting a touch operation on or near the touchscreen 341, the touchscreen 341 transmits information about the touch operation to the processor 380 to determine a type of a touch event. Then, the processor 380 provides corresponding visual output on the display panel 351 based on the type of the touch event. In FIG. 11, the touchscreen 341 and the display panel 351 are used as two independent parts to implement input and output functions of the mobile phone 300. However, in some embodiments, the touchscreen 341 and the display panel 351 may be integrated to implement the input and output functions of the mobile phone 300.

The gravity sensor 360 may detect a value of acceleration in each direction (generally, three axes) of the mobile phone, may detect a value and a direction of gravity in a stationary mode, and may be used for an application that identifies a mobile phone posture (such as screen orientation switching, related games, and magnetometer posture calibration), a function related to vibration identification (such as a pedometer and a strike), and the like.

The mobile phone 300 may further include another sensor, such as a light sensor. Specifically, the light sensor may include an ambient light sensor and a proximity sensor. The ambient light sensor may adjust luminance of the display panel 351 according to brightness of ambient light, and the proximity sensor may detect whether an object is approaching or touches the mobile phone, and may disable the display panel 351 or backlight when the mobile phone 300 approaches an ear. A gyroscope, a barometer, a hygrometer, a thermometer, an infrared sensor, and other sensors may be further configured for the mobile phone 300. Details are not described herein.

The audio frequency circuit 370, a speaker 371, and a microphone 372 may provide audio interfaces between the user and the mobile phone 300. The audio frequency circuit 370 may transmit, to the speaker 371, an electrical signal converted from received audio data, and the speaker 371 converts the electrical signal into a sound signal for output. In addition, the microphone 372 converts a collected sound signal into an electrical signal, and the audio frequency circuit 370 receives the electrical signal, converts the electrical signal into audio data, and outputs the audio data to the RF circuit 320 to send the audio data to, for example, another mobile phone, or outputs the audio data to the memory 330 for further processing.

The processor 380 is a control center of the mobile phone 300, uses various interfaces and lines to connect all parts of the whole mobile phone, and performs various functions and data processing of the mobile phone 300 by running or executing the software program and/or the module stored in the memory 330 and invoking data stored in the memory 330, so as to perform overall monitoring on the mobile phone. Optionally, the processor 380 may include one or more processing units. An application processor and a modem processor may be integrated into the processor 380. The application processor mainly processes an operating system, a user interface, an application program, and the like. The modem processor mainly processes wireless communication. It may be understood that the foregoing modem processor may not be integrated into the processor 380.

The mobile phone 300 further includes the power source 390, such as a battery, that supplies power to each component. The power supply may be logically connected to the processor 380 by using a power management system, so that functions such as charging and discharging management and power consumption management are implemented by using the power management system.

Although not shown in the figure, the mobile phone 300 may further include a Wi-Fi module, a Bluetooth module, and the like. Details are not described herein.

In this embodiment of the present disclosure, the RF circuit 320 is further configured to receive first control information sent by a server. The first control information carries a first control instruction and a system identifier of a first operating system. The first control instruction instructs to perform an indicated operation on the terminal. The first operating system is one of at least two operating systems on the terminal. The first control information instructs to control the terminal according to the first control instruction when a foreground operating system of the terminal is the first operating system.

The processor 380 is further configured to determine, based on the system identifier of the first operating system, that the foreground operating system of the terminal is not the first operating system, and store a correspondence between the system identifier of the first operating system and the first control instruction in the memory 330.

After the foreground operating system of the terminal is changed to the first operating system, the processor 380 is further configured to control the terminal according to the first control instruction in the correspondence.

In this embodiment of the present disclosure, the RF circuit 320 is further configured to receive second control information sent by the server. The second control information carries a second control instruction and a system identifier of a second operating system. The second control instruction instructs to perform an indicated operation on the terminal. The second operating system is one of the at least two operating systems on the terminal. The second control information instructs to control the terminal according to the second control instruction when the foreground operating system of the terminal is the second operating system.

The processor 380 is further configured to determine, based on the system identifier of the second operating system, that the foreground operating system of the terminal is the second operating system, and control the terminal according to the second control instruction.

Further, the processor 380 is configured to store, in the memory 330, a correspondence between the system identifier of the second operating system and the second control instruction; determine that the foreground operating system of the terminal is changed, and if the changed foreground operating system is the second operating system, obtain the second control instruction from the correspondence between the system identifier of the second operating system and the second control instruction; and control the terminal according to the second control instruction.

Further, the RF circuit 320 is configured to receive third control information sent by the server. The third control information carries a third control instruction but no system identifier. The third control instruction instructs to perform an indicated operation on the terminal. The third control information instructs to control the terminal according to the third control instruction when the foreground operating system of the terminal is a preset operating system. The preset operating system is one of the at least two operating systems of the terminal.

The processor 380 is further configured to determine that the foreground operating system of the terminal is the preset operating system, and control the terminal according to the third control instruction.

Further, the RF circuit 320 is configured to detect whether a communication connection between the terminal and the server is normal; if the communication connection between the terminal and the server is normal, send, to the server, an obtaining request used for obtaining the first control information; and receive the first control information returned by the server according to the obtaining request.

Further, the RF circuit 320 is configured to receive stop control information sent by the server. The stop control information carries the first control instruction and the system identifier of the first operating system. The stop control information instructs to stop controlling the terminal according to the first control instruction when the foreground operating system of the terminal is the first operating system.

The processor 380 is further configured to delete, based on the stop control information received by the receiving unit, the correspondence, between the system identifier of the first operating system and the first control instruction, that is stored in the memory 330.

Further, in a process in which the processor 380 controls the terminal according to the second control instruction, the processor 380 is further configured to: power off a Wi-Fi device by using driver information of the Wi-Fi device in the terminal.

Further, in a process in which the processor 380 controls the terminal according to the second control instruction, the processor 380 is further configured to power on the Wi-Fi device by using the driver information of the Wi-Fi device in the terminal, and set a Wi-Fi access point identifier list of an office operating system by using an API in a system service of a container, where the container bears the office operating system, and the Wi-Fi access point identifier list includes only an identifier of a preset access point.

Figure 12:
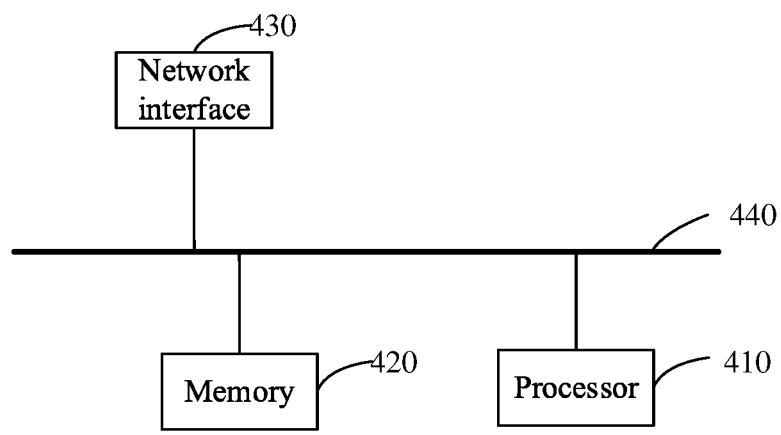
FIG. 12 is a schematic diagram of a structure of a proxy server according to an example embodiment.

FIG. 12 is a schematic diagram of a structure of a proxy server according to an example embodiment. Referring to FIG. 12, the proxy server 310 includes a processor 410, a memory 420, and a network interface 430. The processor 410, the memory 420, and the network interface 430 are connected to each other by using a bus 440.

The memory 420 includes but is not limited to a random-access memory (RAM), a read-only memory (ROM), an erasable programmable read-only memory (EPROM), a flash memory), or a compact disc read-only memory (CD-ROM).

The processor 410 may be one or more central processing units (CPUs). When the processor 410 is one CPU, the CPU may be a single-core CUP, or may be a multi-core CPU.

The network interface 430 may be a wired interface, for example, a Fiber Distributed Data Interface (FDDI) or a Gigabit Ethernet (GE) interface; or the network interface 430 may be a wireless interface.

The network interface 430 is further configured to receive control information and a terminal identifier, where the control information and the terminal identifier are sent by a management server communicatively connected to the proxy server, the control information carries a control instruction and a system identifier of an operating system, the control instruction instructs to perform an indicated operation on a terminal corresponding to the terminal identifier, the operating system is one of at least two operating systems on the terminal, and the control information instructs to control the terminal according to the control instruction when a foreground operating system of the terminal is the operating system; and after a communication connection between the proxy server and the terminal is normal, send the control information to the terminal based on the terminal identifier.

The memory 420 is configured to store a correspondence between the control information and the terminal identifier.

The processor 410 in the proxy server 310 is configured to: after reading program code stored in the memory 420, perform the following operations: determining that the communication connection between the proxy server and the terminal is abnormal, and storing the correspondence between the control information and the terminal identifier.

For the apparatus in the foregoing embodiment, specific manners of executing operations by each module are described in detail in the embodiments related to the method, and details are not described herein.

A person skilled in the art can easily figure out another implementation solution of the present disclosure after considering the specification and practicing the present disclosure that is disclosed herein. This application is intended to cover any variations, functions, or adaptive changes of the embodiments of the present disclosure. These variations, functions, or adaptive changes comply with general principles of the present disclosure, and include common knowledge or a commonly used technical means in the technical field that is not disclosed in the embodiments of the present disclosure. The specification and the embodiments are merely considered as examples, and the actual scope and the spirit of the embodiments of the present disclosure are pointed out by the following claims.

It should be understood that the embodiments of the present disclosure are not limited to the accurate structures that are described in the foregoing and that are shown in the accompanying drawings, and modifications and changes may be made without departing from the scope of the present disclosure. The scope of the embodiments of the present disclosure is limited only by the appended claims.

What is claimed is:

1. A method implemented by a terminal and comprising:
receiving, from a server, first control information carrying a first control instruction and a first system identifier of a first operating system, wherein the first control instruction instructs performance of a first operation on the terminal, wherein the first operating system is one of a plurality of operating systems running on the terminal, and wherein the first control information instructs controlling of the terminal according to the first control instruction when a foreground operating system of the terminal is the first operating system, wherein the foreground operating system occupies a display resource of the terminal while a background operating system does not occupy the display resource;
determining, based on the first system identifier, that the foreground operating system is not the first operating system;
storing a first correspondence between the first system identifier and the first control instruction;
changing the foreground operating system to the first operating system;
controlling, after the changing, the terminal according to the first correspondence;
receiving, from the server, third control information carrying a third control instruction and excluding a system identifier of an operating system, wherein the third control instruction instructs performance of a third operation on the terminal, wherein the third control information instructs controlling of the terminal according to the third control instruction when the foreground operating system of the terminal is a preset operating system, and wherein the preset operating system is one of the plurality of operating systems of the terminal;
determining, that the foreground operating system is the preset operating system; and
controlling, the terminal according to the third control instruction.

2. The method of claim 1, further comprising:
receiving, from the server, second control information carrying a second control instruction and a second system identifier of a second operating system, wherein the second control instruction instructs performance of a second operation on the terminal, wherein the second operating system is one of the plurality of operating systems, and wherein the second control information instructs controlling of the terminal according to the second control instruction when the foreground operating system is the second operating system;

determining, based on the second system identifier, that the foreground operating system is the second operating system; and controlling, the terminal according to the second control instruction.

3. The method of claim 2, further comprising storing a second correspondence between the second system identifier and the second control instruction.

4. The method of claim 2, wherein the second operating system is a personal operating system, wherein the second control instruction instructs prohibition from using a Wi-Fi device in the terminal, and wherein the method further comprises powering off the Wi-Fi device using driver information of the Wi-Fi device.

5. The method of claim 2, wherein the second operating system is an office operating system, wherein the second control instruction indicates that a Wi-Fi device may be used in the terminal and that only a preset access point can be connected when the Wi-Fi device is used in the terminal, wherein the method further comprises:

powering on the Wi-Fi device by using driver information of the Wi-Fi device; and setting a Wi-Fi access point identifier list of the office operating system using an application program interface (API) in a system service of a container, wherein the container bears the office operating system, and wherein the Wi-Fi access point identifier list comprises an identifier of the preset access point.

6. The method of claim 1, further comprising:

detecting whether a communication connection between the terminal and the server is normal, wherein the communication connection is normal when the communication connection is connected and the terminal has permission to use the communication connection;

sending, to the server when the communication connection is normal, a request for the first control information; and receiving, from the server in response to the request, the first control information.

7. The method of claim 1, further comprising:

receiving, from the server, stop control information carrying the first control instruction and the first system identifier, wherein the stop control information instructs stopping of control of the terminal according to the first control instruction when the foreground operating system is the first operating system; and deleting, in response to the stop control information, the first correspondence.

8. A terminal comprising:

a radio frequency (RF) circuit configured to:

receive, from a server, first control information carrying a first control instruction and a first system identifier of a first operating system, wherein the first control instruction instructs performance of a first operation on the terminal, wherein the first operating system is one of a plurality of operating systems running on the terminal, and wherein the first control information instructs controlling of the terminal according to the first control instruction when a foreground operating system of the terminal is the first operating system, wherein the foreground operating system occupies a display resource of the terminal while a background operating system does not occupy the display resource; and receive, from the server, third control information carrying a third control instruction and excluding a system identifier of an operating system, wherein the third control instruction instructs performance of a third operation on the terminal, wherein the third control information instructs controlling of the terminal according to the third control instruction when the foreground operating system is a preset operating system, wherein the preset operating system is one of the plurality of operating systems of the terminal; and a processor coupled to the RF circuit and configured to:

determine, based on the first system identifier, that the foreground operating system is not the first operating system;

store a first correspondence between the first system identifier and the first control instruction;

change the foreground operating system to the first operating system;

control, after the changing, the terminal according to the first correspondence;

determine that the foreground operating system is the preset operating system; and control the terminal according to the third control instruction.

9. The terminal of claim 8, wherein the RF circuit is further configured to receive, from the server, second control information carrying a second control instruction and a second system identifier of a second operating system, wherein the second control instruction instructs performance of a second operation on the terminal, wherein the second operating system is one of the plurality of operating systems, and wherein the second control information instructs controlling of the terminal according to the second control instruction when the foreground operating system is the second operating system, and wherein the processor is further configured to:

determine, based on the second system identifier, that the foreground operating system is the second operating system; and control the terminal according to the second control instruction.

10. The terminal of claim 9, wherein the processor is further configured to store a second correspondence between the second system identifier and the second control instruction.

11. The terminal of claim 9, wherein the second operating system is a personal operating system, wherein the second control instruction instructs prohibition from using a Wi-Fi device in the terminal, and wherein the processor is further configured to power off the Wi-Fi device using driver information of the Wi-Fi device.

12. The terminal of claim 9, wherein the second operating system is an office operating system, wherein the second control instruction indicates that a Wi-Fi device may be used in the terminal and that only a preset access point can be connected when the Wi-Fi device is used, wherein the processor is further configured to:

power on the Wi-Fi device by using driver information of the Wi-Fi device; and set a Wi-Fi access point identifier list of the office operating system using an application program interface (API) in a system service of a container,
wherein the container bears the office operating system, and
wherein the Wi-Fi access point identifier list comprises an identifier of the preset access point.

13. The terminal of claim 8, wherein the processor is further configured to:
detect whether a communication connection between the terminal and the server is normal, wherein the communication connection is normal when the communication connection is connected and the terminal has permission to use the communication connection;
send, to the server when the communication connection is normal, a request for the first control information; and
receive, from the server in response to the request, the first control information.

14. The terminal of claim 8, wherein the RF circuit is further configured to receive, from the server, stop control information carrying the first control instruction and the first system identifier of the first operating system, wherein the stop control information instructs stopping control of the terminal according to the first control instruction when the foreground operating system is the first operating system, and wherein the processor is further configured to delete, in response to the stop control information, the first correspondence.

15. A computer program product comprising instructions that are stored on a computer-readable medium and that, when executed by a processor, cause a terminal to:
receive, from a server, first control information carrying a first control instruction and a first system identifier of a first operating system, wherein the first control instruction instructs performance of a first operation on the terminal, wherein the first operating system is one of a plurality of operating systems running on the terminal, and wherein the first control information instructs controlling of the terminal according to the first control instruction when a foreground operating system of the terminal is the first operating system, wherein the foreground operating system occupies a display resource of the terminal while a background operating system does not occupy the display resource;
determine, based on the first system identifier, that the foreground operating system is not the first operating system;
store a first correspondence between the first system identifier and the first control instruction;
change the foreground operating system to the first operating system;
control, after the changing, the terminal according to the first correspondence;
receive, from the server, third control information carrying a third control instruction and excluding a system identifier of an operating system, wherein the third control instruction instructs performance of a third operation on the terminal, wherein the third control information instructs controlling of the terminal according to the third control instruction when the foreground operating system of the terminal is a preset operating system, and wherein the preset operating system is one of the plurality of operating systems of the terminal;
determine, that the foreground operating system is the preset operating system; and
control the terminal according to the third control instruction.

16. The computer program product of claim 15, wherein the instructions, when executed by the processor, further cause the terminal to:
receive, from the server, second control information carrying a second control instruction and a second system identifier of a second operating system, wherein the second control instruction instructs performance of a second operation on the terminal, wherein the second operating system is one of the plurality of operating systems, and wherein the second control information instructs controlling of the terminal according to the second control instruction when the foreground operating system is the second operating system;
determine, based on the second system identifier, that the foreground operating system is the second operating system; and
control the terminal according to the second control instruction.

17. The computer program product of claim 16, wherein the instructions, when executed by the processor, further cause the terminal to store a second correspondence between the second system identifier and the second control instruction.

18. The computer program product of claim 16, wherein the second operating system is a personal operating system, wherein the second control instruction instructs prohibition from using a Wi-Fi device in the terminal, and wherein the instructions, when executed by the processor, further cause the terminal to power off the Wi-Fi device using driver information of the Wi-Fi device.

19. The computer program product of claim 16, wherein the second operating system is an office operating system, wherein the second control instruction indicates that a Wi-Fi device may be used in the terminal and that only a preset access point can be connected when the Wi-Fi device is used in the terminal, wherein the instructions, when executed by the processor, further cause the terminal to:
power on the Wi-Fi device by using driver information of the Wi-Fi device; and
set a Wi-Fi access point identifier list of the office operating system using an application program interface (API) in a system service of a container,
wherein the container bears the office operating system, and
wherein the Wi-Fi access point identifier list comprises an identifier of the preset access point.

20. The computer program product of claim 15, wherein the instructions, when executed by the processor, further cause the terminal to:
detect whether a communication connection between the terminal and the server is normal, wherein the communication connection is normal when the communication connection is connected and the terminal has permission to use the communication connection;
send, to the server when the communication connection is normal, a request for the first control information; and
receive, from the server in response to the request, the first control information.

21. A computer-readable medium storing instructions that, when executed by a processor, cause a terminal to:
receive, from a server, first control information carrying a first control instruction and a first system identifier of a first operating system, wherein the first control instruction instructs performance of a first operation on the terminal, wherein the first operating system is one of a plurality of operating systems running on the terminal, and wherein the first control information instructs controlling of the terminal according to the first control instruction when a foreground operating system of the terminal is the first operating system, wherein the foreground operating system occupies a display resource of the terminal while a background operating system does not occupy the display resource;

determine, based on the first system identifier, that the foreground operating system is not the first operating system;

store a first correspondence between the first system identifier and the first control instruction;

change the foreground operating system to the first operating system;

control, after the changing, the terminal according to the first correspondence;

receive, from the server, third control information carrying a third control instruction and excluding a system identifier of an operating system, wherein the third control instruction instructs performance of a third operation on the terminal, wherein the third control information instructs controlling of the terminal according to the third control instruction when the foreground operating system of the terminal is a preset operating system, and wherein the preset operating system is one of the plurality of operating systems of the terminal;

determine, that the foreground operating system is the preset operating system; and control the terminal according to the third control instruction.

22. The computer-readable medium of claim 21, wherein the instructions, when executed by the processor, further cause the terminal to:

receive, from the server, second control information carrying a second control instruction and a second system identifier of a second operating system, wherein the second control instruction instructs performance of a second operation on the terminal, wherein the second operating system is one of the plurality of operating systems, and wherein the second control information instructs controlling of the terminal according to the second control instruction when the foreground operating system is the second operating system;

determine, based on the second system identifier, that the foreground operating system is the second operating system; and control the terminal according to the second control instruction.

23. The computer-readable medium of claim 22, wherein the instructions, when executed by the processor, further cause the terminal to store a second correspondence between the second system identifier and the second control instruction.

24. The computer-readable medium of claim 22, wherein the second operating system is a personal operating system, wherein the second control instruction instructs prohibition from using a Wi-Fi device in the terminal, and wherein the instructions, when executed by the processor, further cause the terminal to power off the Wi-Fi device using driver information of the Wi-Fi device.

25. The computer-readable medium of claim 22, wherein the second operating system is an office operating system, wherein the second control instruction indicates that a Wi-Fi device may be used in the terminal and that only a preset access point can be connected when the Wi-Fi device is used in the terminal, wherein the instructions, when executed by the processor, further cause the terminal to:

power on the Wi-Fi device by using driver information of the Wi-Fi device; and set a Wi-Fi access point identifier list of the office operating system using an application program interface (API) in a system service of a container, wherein the container bears the office operating system, and wherein the Wi-Fi access point identifier list comprises an identifier of the preset access point.

26. The computer-readable medium of claim 21, wherein the instructions, when executed by the processor, further cause the terminal to:

detect whether a communication connection between the terminal and the server is normal, wherein the communication connection is normal when the communication connection is connected and the terminal has permission to use the communication connection;

send, to the server when the communication connection is normal, a request for the first control information; and receive, from the server in response to the request, the first control information.

\* \* \* \* \*